United States Patent
Hedayat

(10) Patent No.: US 9,742,543 B2
(45) Date of Patent: Aug. 22, 2017

(54) ACKNOWLEDGMENT MECHANISMS FOR OFDMA OPERATION

(71) Applicant: NEWRACOM, INC., Irvine, CA (US)

(72) Inventor: Ahmad Reza Hedayat, Irvine, CA (US)

(73) Assignee: Newracom, Inc., Irvine, CA (US)

( * ) Notice: Subject to any disclaimer, the term of this patent is extended or adjusted under 35 U.S.C. 154(b) by 60 days.

(21) Appl. No.: 14/798,433

(22) Filed: Jul. 13, 2015

(65) Prior Publication Data

US 2016/0087775 A1    Mar. 24, 2016

Related U.S. Application Data

(60) Provisional application No. 62/129,951, filed on Mar. 8, 2015, provisional application No. 62/129,847, filed
(Continued)

(51) Int. Cl.
*H04L 5/00* (2006.01)
*H04L 1/12* (2006.01)
*H04W 74/08* (2009.01)

(52) U.S. Cl.
CPC .............. *H04L 5/0055* (2013.01); *H04L 1/12* (2013.01); *H04L 5/0007* (2013.01); *H04W 74/0816* (2013.01)

(58) Field of Classification Search
CPC ....... H04L 5/0055; H04L 1/12; H04L 5/0007; H04W 74/0816
See application file for complete search history.

(56) References Cited

U.S. PATENT DOCUMENTS

| 2012/0113831 A1* | 5/2012 | Pelletier | H04L 5/0058 370/252 |
| 2014/0328282 A1* | 11/2014 | Nakao | H04L 5/003 370/329 |

(Continued)

OTHER PUBLICATIONS

LAN/MAN Standards Committee of the IEEE Computer Society, "IEEE P802.11ah™/D5.0 Draft Standard for Information technology—Telecommunications and information exchange between systems Local and metropolitan area networks—Specific requirements, Part 11: Wireless Lan Medium Access Control (MAC) and Physical Layer (PHY) Specifications, Amendment 2: Sub 1 GHz License Exempt Operation," Mar. 2015.
(Continued)

*Primary Examiner* — Duc C Ho
(74) *Attorney, Agent, or Firm* — McDermott Will & Emery LLP

(57) ABSTRACT

In an example of wireless communications based on orthogonal frequency-division multiple access (OFDMA), an access point may send a downlink frame to multiple stations. In response, some or all of the stations may transmit their respective uplink frames simultaneously after a predetermined time period. The uplink frames from the stations may be aggregated or multiplexed to form a final uplink frame that is received by the access point. Each of the uplink frames from the stations may include at least a legacy header and an acknowledgment frame. While a legacy header occupies the entire channel bandwidth of its uplink frame, an acknowledgment frame occupies a sub-band assigned to its station, where a sub-band is a portion of the channel bandwidth. Other methods, apparatus, and computer-readable media are also disclosed.

16 Claims, 13 Drawing Sheets

Related U.S. Application Data on Mar. 7, 2015, provisional application No. 62/054,274, filed on Sep. 23, 2014.

(56) References Cited

U.S. PATENT DOCUMENTS

| | | | | |
|---|---|---|---|---|
| 2015/0146807 A1* | 5/2015 | Zhang | ............... | H04L 5/0007 375/260 |
| 2015/0289164 A1* | 10/2015 | Seok | ............... | H04W 84/12 370/311 |
| 2015/0365940 A1* | 12/2015 | Chu | ............... | H04B 7/0452 370/329 |
| 2016/0065466 A1* | 3/2016 | Abraham | ............... | H04L 45/74 370/392 |

OTHER PUBLICATIONS

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

* cited by examiner

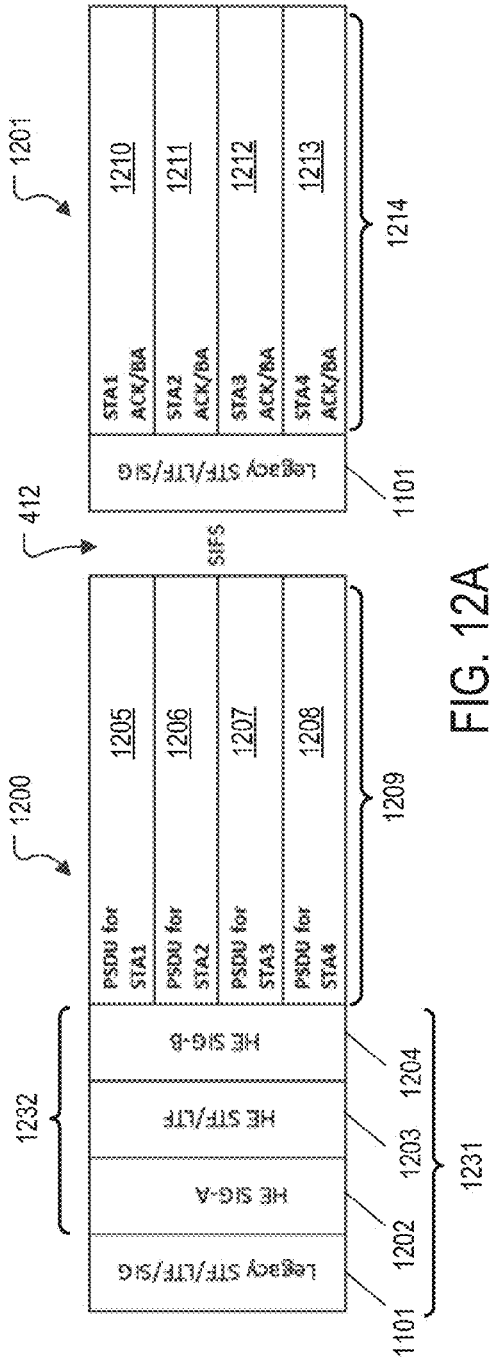
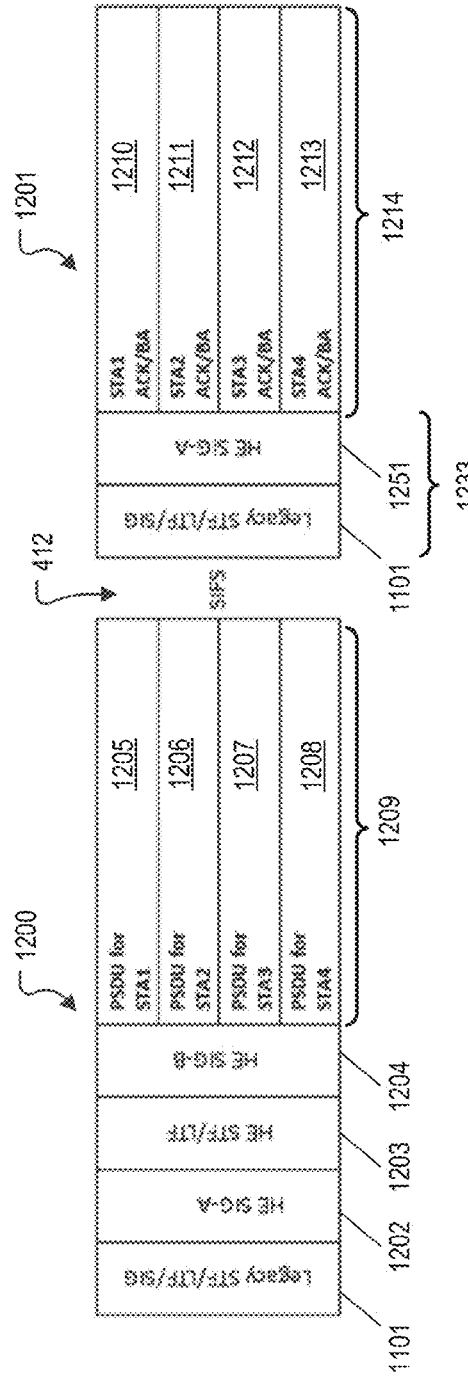
FIG. 12A
FIG. 12B

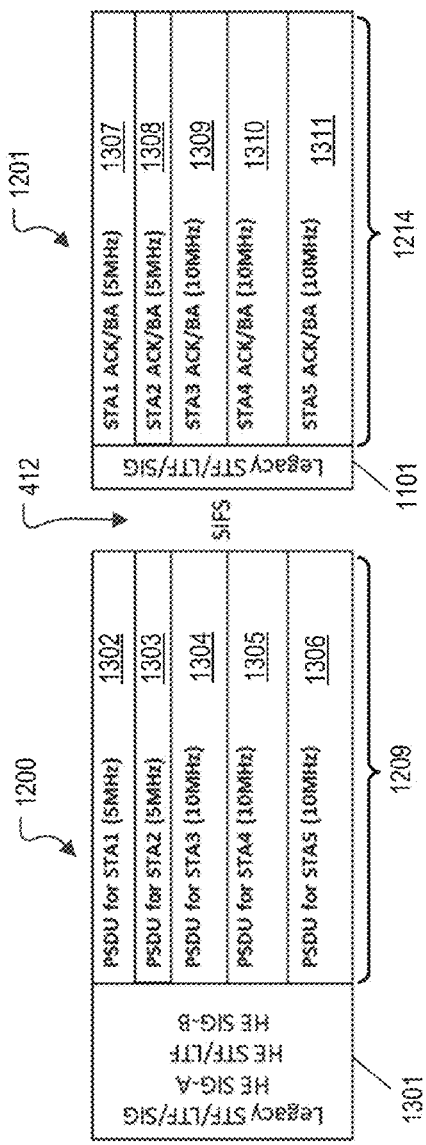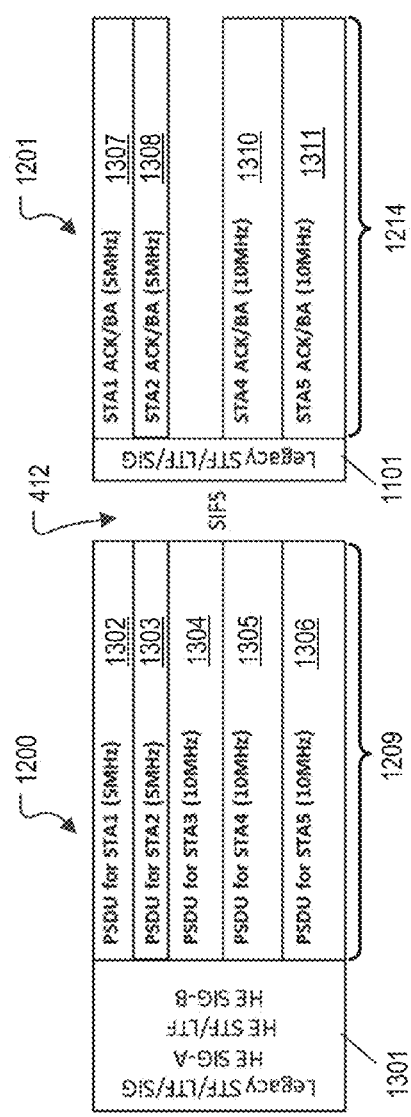
FIG. 13A
FIG. 13B

ACKNOWLEDGMENT MECHANISMS FOR OFDMA OPERATION

CROSS-REFERENCE TO RELATED APPLICATIONS

This application claims the benefit of priority from U.S. Provisional Application No. 62/129,951, entitled "ACKNOWLEDGMENT MECHANISMS FOR OFDMA OPERATION," filed Mar. 8, 2015, U.S. Provisional Application No. 62/129,847, entitled "ACKNOWLEDGMENT MECHANISMS FOR OFDMA OPERATION," filed Mar. 7, 2015, and U.S. Provisional Application No. 62/054,274, entitled "ACK AGGREGATION USING ORTHOGONAL CODES," filed Sep. 23, 2014, all of which are incorporated herein by reference in their entirety.

TECHNICAL FIELD

The present description relates in general to wireless communication systems, and more particularly to, for example, without limitation, acknowledgment mechanisms for orthogonal frequency-division multiple access (OFDMA) operation.

BACKGROUND

Wireless local area network (WLAN) devices are deployed in diverse environments. These environments are generally characterized by the existence of access points and non-access point stations. Increased interference from neighboring devices gives rise to performance degradation. Additionally, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

The description provided in the background section should not be assumed to be prior art merely because it is mentioned in or associated with the background section. The background section may include information that describes one or more aspects of the subject technology.

BRIEF DESCRIPTION OF THE DRAWINGS

FIGS. 12A-12B illustrate schematic diagrams of first and second examples of a downlink (DL) frame and an uplink (UL) frame.

FIG. 13A illustrates a schematic diagram of a third example of a downlink frame and an uplink frame.

FIG. 13B illustrates a schematic diagram of a fourth example of a downlink frame and an uplink frame.

Figure 1:
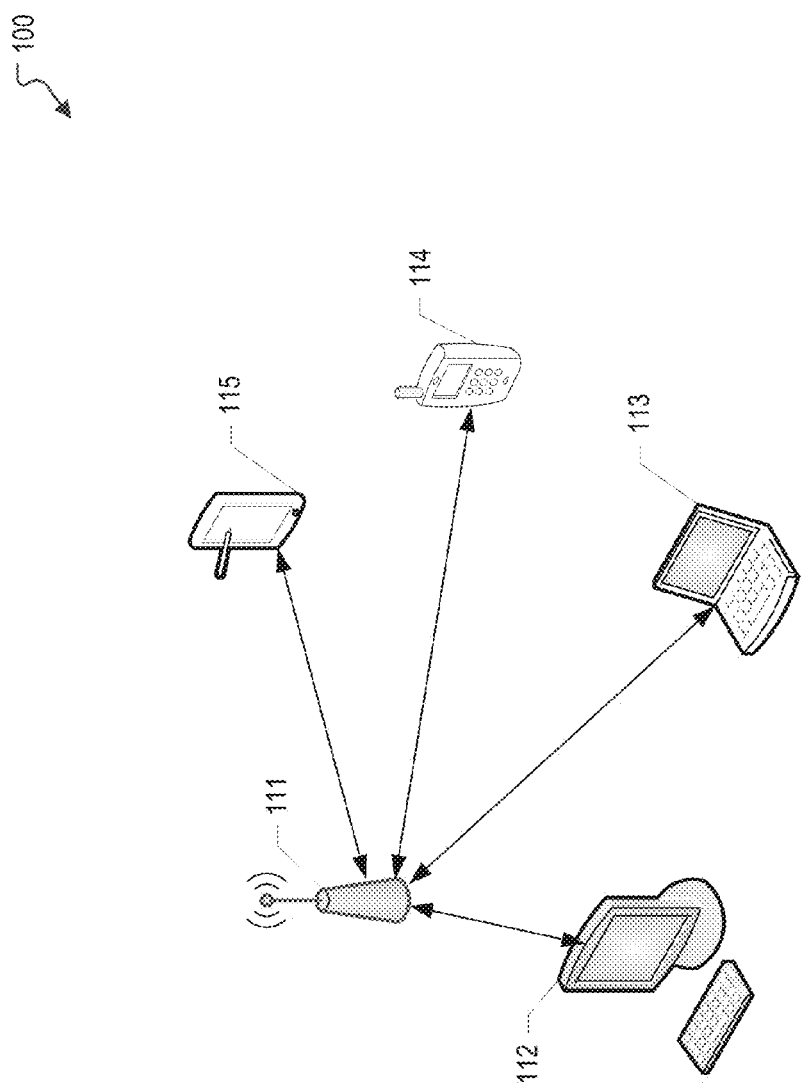
FIG. 1 illustrates a schematic diagram of an example of a wireless communication network.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive. Like reference numerals designate like elements.

While wireless communication system requirements may be focused on, for example, improving aggregate throughput, one or more aspects of the present disclosure relate to improving user experience and relate to metrics that reflect user experience, such as average per station throughput, the fifth percentile of per station throughput of a group of stations, and area throughput. Aspects of the present disclosure relate to environments such as wireless corporate offices, outdoor hotspots, dense residential apartments, and stadiums.

In one or more aspects, the present disclosure relates to WLAN indoor and outdoor operation in the 2.4 GHz and the 5 GHz frequency bands. Additional bands (e.g., bands between 1 GHz and 6 GHz) may be added as they become available. The increase in average throughput per station may not be limited to four times improvement, where improvement values in the range of 5-10 times may be targeted, depending on technology and scenario. Stationary and pedestrian speeds may be factors for outdoor operation.

Average throughput per station may be directly proportional to both aggregate basic service set (BSS) throughput and area throughput. The fifth percentile measure of per station throughput may be used to determine that the desired distribution of throughput among a number of stations in an area is satisfied. These metrics, along with the satisfaction of the packet delay and the packet error ratio (PER) requirements of applications, may directly correspond to user experience in various scenarios.

Certain scenarios, such as residential, enterprise, indoor and outdoor hotspots, highlight three categories of aspects to improve WLAN efficiency: (a) make more efficient use of spectrum resources in scenarios with a relatively high density of stations (STAs) per BSS, (b) increase spectral frequency reuse and manage interference between neighboring overlapping BSS (OBSS) in scenarios with a relatively high density of both STAs and BSSs, and (c) increase robustness in outdoor propagation environments and uplink transmissions.

One or more aspects of the present disclosure include techniques for simultaneous communications in both spatial and frequency domains, in both uplink (UL) and downlink (DL) direction. Further, power efficiency may be included as a metric to measure consumption of devices that may be powered by batteries, taking into account average power consumption for a given scenario.

Orthogonal frequency-division multiple access (OFDMA) is a technique that can be used in next generation WLAN technologies (e.g., IEEE 802.11ax which is also referred to as high efficiency (HE) technology) in order to enhance the aggregation of multiple payloads that are destined to multiple STAs within the same frame. OFDMA provides new opportunities as well as challenges in the design of OFDMA signaling and procedures. Among the opportunities that are provided by OFDMA is frequency selectivity gain, where an access point (AP) would allocate resources to each STA that offer the highest frequency-gain for that STA.

In one or more aspects, the present disclosure describes mechanisms for communicating acknowledgments for OFDMA operation. The mechanisms can be used among IEEE 802.11 STAs (or nodes) while the STAs exchange frames in OFDMA format. In OFDMA transmission, the transmitter node, commonly an AP in 802.11 use cases, sends an OFDMA frame (e.g., DL OFDMA frame) to several client devices/STAs. In response, some or all of the client devices (e.g., STAs) may send an acknowledgment frame in the form of an acknowledgment (ACK) frame or block acknowledgment (Block Ack, BlockAck, or BA) frame via a UL OFDMA frame. One or more aspects of the present disclosure provide a UL OFDMA frame (or a multi-user (MU) ACK frame) with a specific format. This allows multiple client devices (e.g., STAs) to participate in forming the UL OFDMA frame (or MU ACK frame) by embedding the client devices' ACK, or BA frames into the UL OFDMA frame. In one or more aspects, several ACK or BA frames are embedded into a single MU ACK frame. The details of setting the parameters for the MU ACK frame are described herein.

FIG. 1 illustrates a schematic diagram of an example of a wireless communication network 100. In the wireless communication network 100, such as a wireless local area network (WLAN), a basic service set (BSS) includes a plurality of wireless communication devices (e.g., WLAN devices). In one aspect, a BSS refers to a set of STAs that can communicate in synchronization, rather than a concept indicating a particular area. In this example, the wireless communication network 100 includes wireless communication devices 111-115, which may be referred to as stations (STAs).

Each of the wireless communication devices 111-115 may include a medium access control (MAC) layer and a physical (PHY) layer according to an Institute of Electrical and Electronics Engineers (IEEE) 802.11 standard. In this example, at least one wireless communication device (e.g., device 111) is an access point (AP). An AP may be referred to as an AP STA or an AP device. The other wireless communication devices (e.g., devices 112-115) may be non-AP STAs. Alternatively, all of the wireless communication devices 111-115 may be non-AP STAs in an Ad-hoc networking environment.

An AP STA and a non-AP STA may be collectively called STAs. However, for simplicity of description, in some aspects, only a non-AP STA may be referred to as a STA. An AP may be, for example, a centralized controller, a base station (BS), a node-B, a base transceiver system (BTS), a site controller, a network adapter, a network interface card (NIC), a router, or the like. An non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

Figure 2:
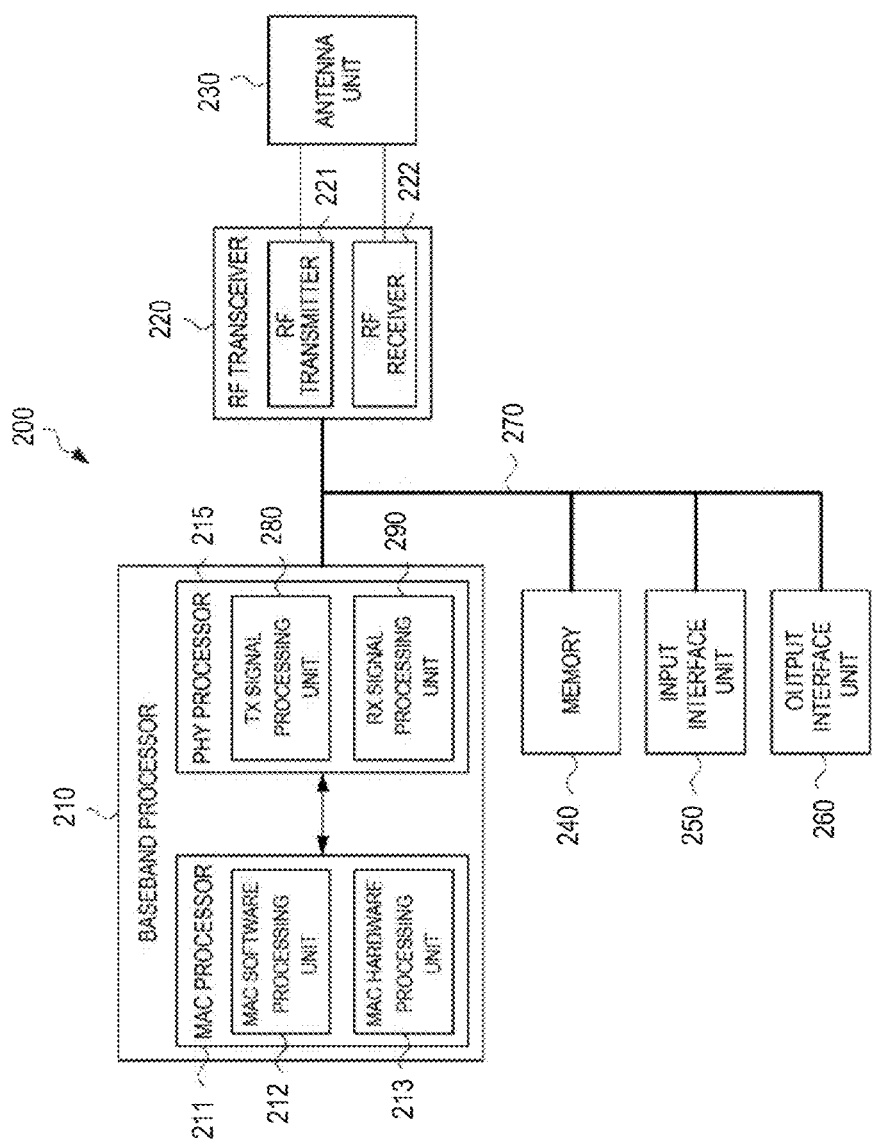
FIG. 2 illustrates a schematic diagram of an example of a wireless communication device.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the wireless communication devices 111-115.

In this example, the baseband processor 210 performs baseband signal processing, and includes a medium access control (MAC) processor 211 and a physical layer (PHY) processor 215. The memory 240 may store software (such as MAC software) including at least some functions of the MAC layer. The memory may further store an operating system and applications.

In this illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PHY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be a non-volatile memory unit that stores instructions even when the wireless communication device 200 is off. The ROM, registers and the permanent storage device may be part of the baseband processor 210 or be a part of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a user, and the output interface unit 260 outputs information to the user. The antenna unit 230 includes one or more antennas. When multiple-input multiple-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. One or more implementations may include devices that function as both input and output devices, such as a touchscreen.

One or more implementations can be realized in part or in whole using a computer-readable medium, in one aspect, a computer-readable medium includes one or more media. In one or more aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In one aspect, a computer is a machine. In one aspect, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the one or more processors cause one or more operations of the subject disclosure to occur or cause an apparatus (e.g., a wireless communication device 200) to perform operations or a method of the subject disclosure.

Figure 3A:
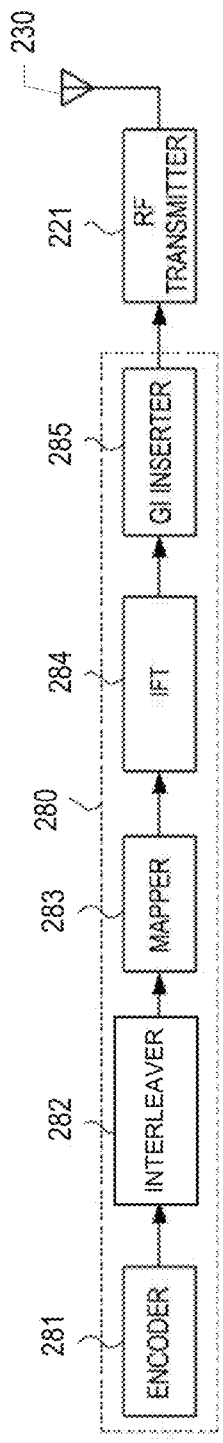
FIG. 3A illustrates a schematic block diagram of an example of a transmitting signal processor in a wireless communication device.

FIG. 3A illustrates a schematic block diagram of an example of a transmitting signal processing unit 280 in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. The interleaver 282 interleaves the bits of each stream output from the encoder 281 to change the order of bits. In one aspect, interleaving may be applied only when BCC encoding is employed. The mapper 283 maps the sequence of bits output from the interleaver 282 into constellation points.

When MIMO or MU-MIMO is employed, the transmitting signal processing unit 280 may use multiple instances of the interleaver 282 and multiple instances of the mapper 283 corresponding to the number of spatial streams ($N_{SS}$). In this example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams ($N_{STS}$) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 284 converts a block of the constellation points output from the mapper 283 or the spatial mapper into a time domain block (e.g., a symbol) by using an inverse discrete Fourier transform (IDFT) or an inverse fast Fourier transform (IFFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GI to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

Figure 3B:
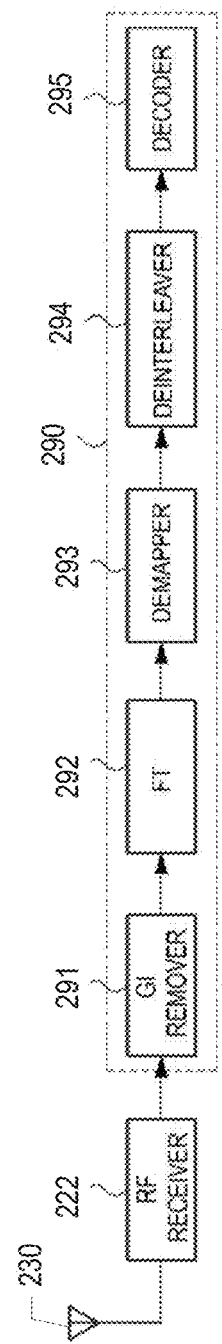
FIG. 3B illustrates a schematic block diagram of an example of a receiving signal processor in a wireless communication device.

FIG. 3B illustrates a schematic block diagram of an example of a receiving signal processing unit 290 in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the GI from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may be a spatial demapper for converting the Fourier transformed receiver chains to constellation points of the space-time streams, and a STBC decoder (not shown) for despreading the constellation points from the space-time streams into the spatial streams.

The demapper 293 demaps the constellation points output from the FT 292 or the STBC decoder to the bit streams. If the LDPC, encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC encoding is used.

When MIMO or MU-MIMO is employed, the receiving signal processing unit 290 may use multiple instances on the demapper 293 and multiple instances of the deinterleaver 294 corresponding to the number of spatial streams. In this example, the receiving signal processing unit 290 may further include a stream deparser for combining the streams output from the deinterleavers 294.

The decoder 295 decodes the streams output from the deinterleaver 294 and/or the stream deparser. For example, the decoder 295 may be an FEC decoder. The FEC decoder may include a BCC decoder or an LDPC decoder.

Figure 4:
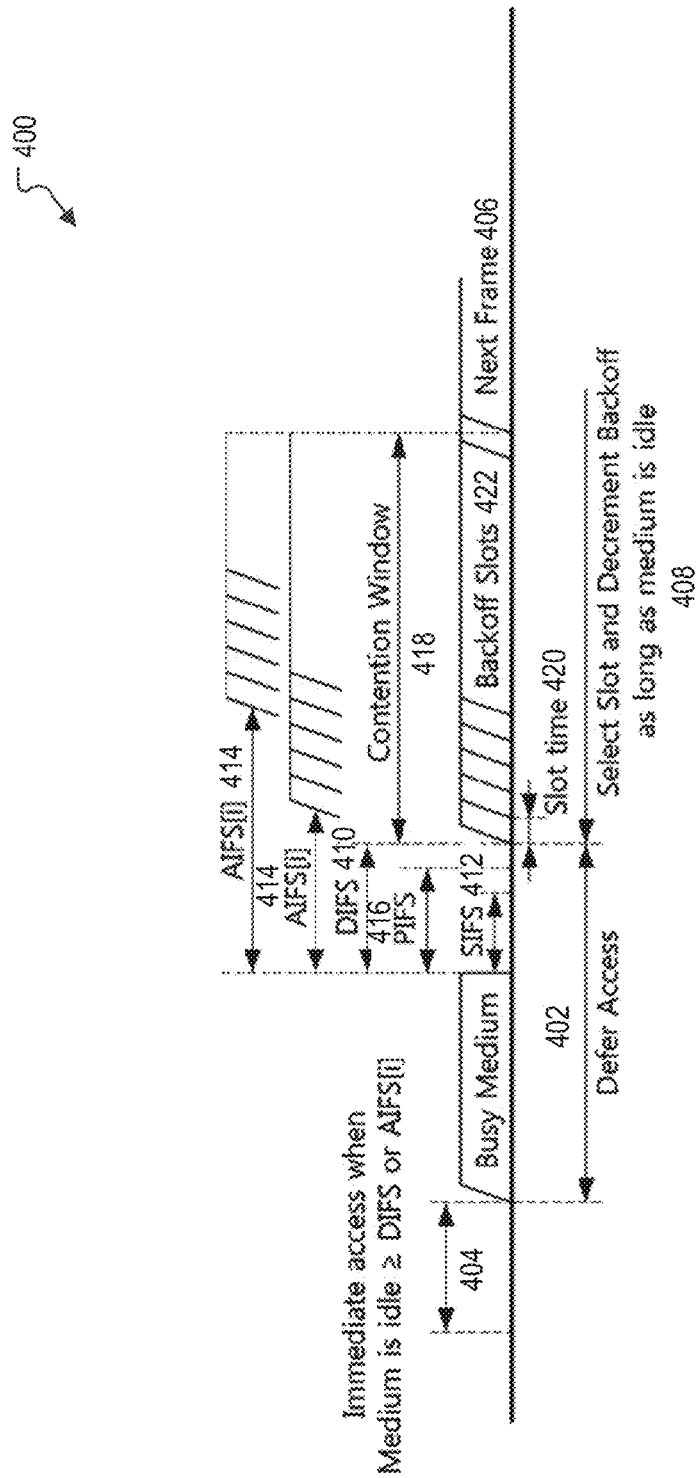
FIG. 4 illustrates an example of a timing diagram of interframe space (IFS) relationships between wireless communication devices.

FIG. 4 illustrates an example of a timing diagram of interframe space (IFS) relationships. In this example, a data frame, a control frame, or a management frame can be exchanged between the wireless communication devices 111-115 and/or other WLAN devices.

Referring to the timing diagram 400, during the time interval 402, access is deferred while the medium (e.g., a wireless communication channel) is busy until a type of IFS duration has elapsed. At time interval 404, immediate access is granted when the medium is idle for a duration that is equal to or greater than a distributed coordination function IFS (DIFS) 410 duration or arbitration IFS (AIFS) 414 duration. In turn, a next frame 406 may be transmitted after a type of IFS duration and a contention window 418 have passed. During the time, 408, if a DIES has elapsed since the medium has been idle, a designated slot time 420 is selected and one or more backoff slots 422 are decremented as long as the medium is idle.

The data frame is used for transmission of data forwarded from a higher layer. In one or more implementations, a WLAN device transmits the data frame after performing backoff if DIES 410 has elapsed from a time when the medium has been idle.

The management frame is used for exchanging management information that is not forwarded to the higher layer. Subtype frames of the management frame include a beacon frame, an association request/response frame, a probe request/response frame, and an authentication request/response frame.

The control frame is used for controlling access to the medium. Subtype frames of the control frame include a request to send (RTS) frame, a clear to send (CTS) frame, and an ACK frame. In the case that the control frame is not a response frame of the other frame (e.g., a previous frame), the WLAN device transmits the control frame after performing backoff if the DIFS 410 has elapsed. In the case that the control frame is the response frame of the other frame, the WLAN device transmits the control frame without performing backoff if a short IFS (SIFS) 412 has elapsed. The type and subtype of frame may be identified by a type field and a subtype field in a frame control field of the frame.

On the other hand, a Quality of Service (QoS) STA may transmit the frame after performing backoff if AIFS 414 for access category (AC), e.g., AIFS[AC], has elapsed. In this case, the data frame, the management frame, or the control frame that is not the response frame may use the AIFS[AC].

In one or more implementations, a point coordination function (PCF) enabled AP STA transmits the frame after performing backoff if a PCF IFS (PIFS) 416 has elapsed. In this example, the PIFS 416 duration is less than the DIFS 410 but greater than the SIRS 412. In some aspects, the PIFS 416 is determined by incrementing the SIFS 412 duration by a designated slot time 420.

Figure 5:
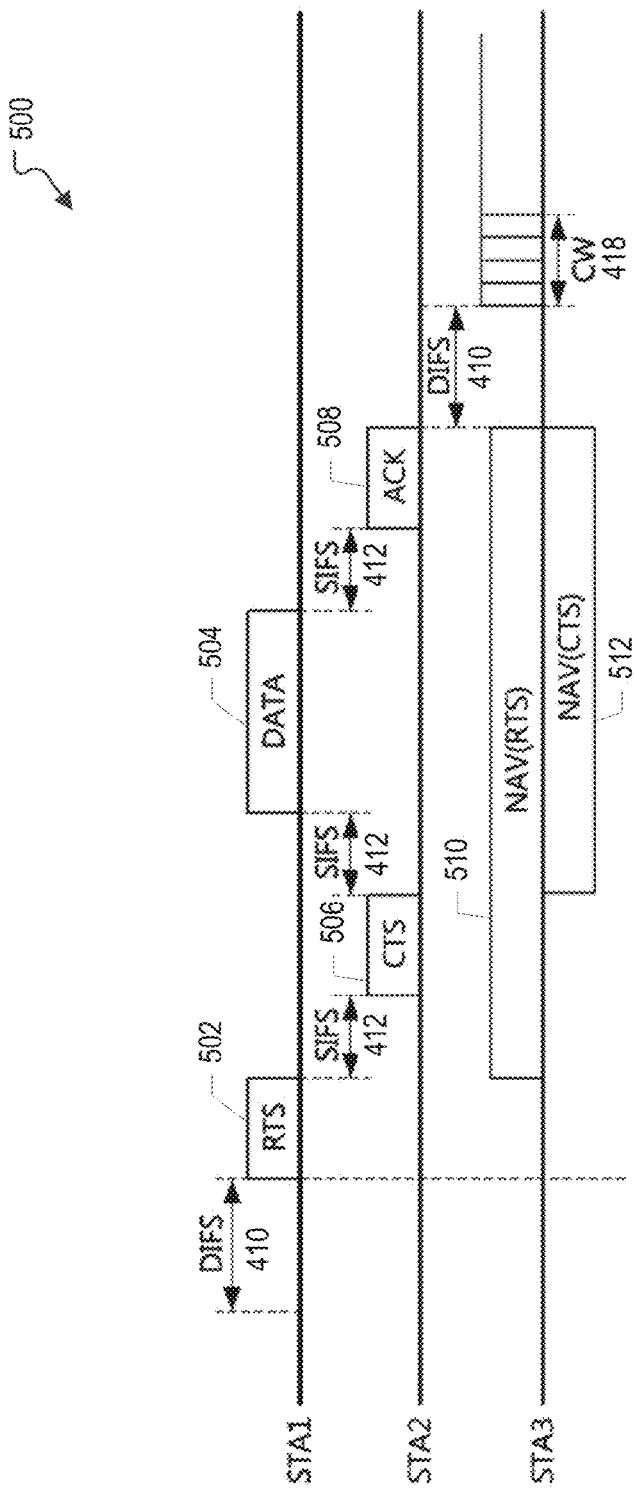
FIG. 5 illustrates an example of a timing diagram of a carrier sense multiple access/collision avoidance (CSMA/CA) based frame transmission procedure.

FIG. 5 illustrates an example of a timing diagram of a carrier sense multiple access/collision avoidance (CSMA/CA) based frame transmission procedure for avoiding collision between frames in a channel. In FIG. 5, any one of the wireless communication devices 111-115 in FIG. 1 can be designated as one of STA1, STA2, or STA3. In this example, the wireless communication device 111 is designated as STA1, the wireless communication device 112 is designated as STA2, and the wireless communication device 113 is designated as STA3. While the timing of the wireless communication devices 114 and 115 is not shown in FIG. 5, the timing of the devices 114 and 115 may be the same as that of STA2.

In this example, STA1 is a transmit WLAN device for transmitting data, STA2 is a receive WLAN device for receiving the data, and STA3 is a WLAN device that may be located at an area where a frame transmitted from the STA1 and/or a frame transmitted from the STA2 can be received by the STA3.

The STA1 may determine whether the channel (or medium) busy by carrier sensing. The STA1 may determine the channel occupation based on an energy level on the channel or correlation of signals in the channel. In one or more implementations, the STA1 determines the channel occupation by using a network allocation vector (NAV) timer.

When determining that the channel is not used by other devices during the DIES 410 (e.g., the channel is idle), the STA1 may transmit an RTS frame 502 to the STA2 after performing backoff. Upon receiving the RTS frame 502, the STA2 may transmit a CTS frame 506 as a response of the RTS frame 502 after the SIFS 412.

When the STA3 receives the RTS frame 502, the STA3 may set a NAV timer for a transmission duration representing the propagation delay of subsequently transmitted frames by using duration information involved with the transmission of the RTS frame 502 (e.g., NAV(RTS) 510). For example, the STA3 may set the transmission duration expressed as the summation of a first instance of the SIFS 412, the CTS frame 506 duration, a second instance of the SIB 412, a data frame 504 duration, a third instance of the SIFS 412 and an ACK frame 508 duration.

When the STA3 receives the CTS frame 506, the STA3 may set a NAV timer (e.g., NAV(CTS) 512) for a transmission duration of subsequently transmitted frames. For example, the STA3 may set the transmission duration expressed as the summation of the second instance of the SIFS 412, the data frame 504 duration, the third instance of the SIFS 412 and the ACK frame 508 duration.

Upon receiving a new frame before the NAV timer expires, the STA3 may update the NAV timer by using duration information included in the new frame. The STA3 does not attempt to access the channel until the NAV timer expires.

When the STA1 receives the CTS frame 506 from the STA2, the STA1 may transmit the data frame 504 to the STA2 after the SIFS 412 elapses from a time when the CTS frame 506 has been completely received. Upon successfully receiving the data frame 504, the STA2 may transmit the ACK frame 508 after the SIFS 412 elapses as an acknowledgment of receiving the data frame 504.

When the NAV timer expires, the STA3 may deter nine whether the channel is busy by performing carrier sensing techniques. Upon determining that the channel is not used by the other WLAN devices (e.g., STA1, STA2) during the DIES 410 after the NAV timer has expired, the STA3 may attempt channel access after a contention window 418 has elapsed. In this example, the contention window 118 may be based on a random backoff.

Figure 6:
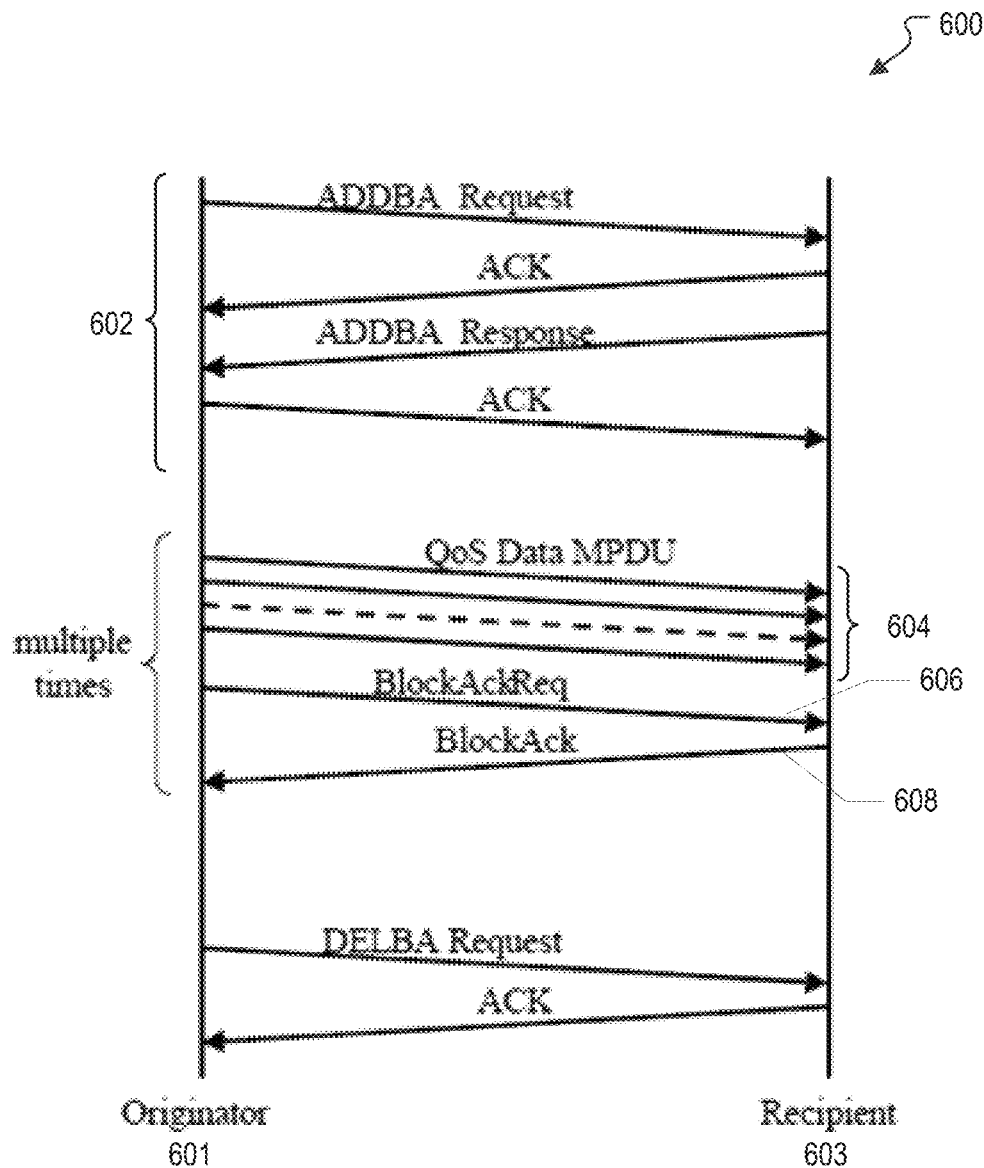
FIG. 6 illustrates a schematic diagram of an example of a request and acknowledgment exchange mechanism related to a block acknowledgment mechanism.

FIG. 6 illustrates a schematic diagram of an example of a request to establish a block acknowledgment exchange mechanism and subsequently transmit data, a block acknowledgment request, and block acknowledgment frames. Note that an ACK frame (e.g., 508 of FIG. 5) is sent to acknowledge the successful reception of a frame by a recipient (e.g., STA2). In one or more implementations, a recipient (e.g., STA2) sends a frame referred to as a block acknowledgment (Block Ack, BlockAck or BA) to acknowledge the successful reception of multiple consecutive frames at once. In this example, a Block Ack mechanism improves channel efficiency by aggregating several acknowledgments into one frame. There are two types of Block Ack mechanisms: immediate and delayed. Immediate Block Ack is suitable for high-bandwidth, tow-latency traffic while the delayed Block Ack is suitable for applications that tolerate moderate latency. In FIG. 6, the STA with data to send using the Block Ack mechanism is referred to as the originator 601, and the receiver of that data as the recipient 603.

The Block Ack mechanism is initialized by an exchange of add block acknowledgment (ADDBA) Request/Response frames 602. After initialization, blocks of QoS data frames 604 may be transmitted from the originator 601 (e.g., a STA such as an AP) to the recipient 603 (e.g., a STA). A block may be initiated within a polled transmission opportunity (TXOP) or by winning an enhanced distributed channel access (EDCA) contention. The number of frames in the block may be limited, and the amount of state that is to be kept by the recipient may be bounded. The MAC protocol data units (MPDUs) within the block of frames are acknowledged by a BlockAck frame 608, which is requested by a BlockAckReq frame 606. The Block Ack mechanism does not require the setting up of a traffic stream (TS); however, QoS STAs using the TS facility may choose to signal their intention to use the Block Ack mechanism for the scheduler's consideration in assigning TXOPs. Acknowledgments of frames belonging to the same traffic identifier (TID), but transmitted during multiple TXOPs, may also be combined into a single BlockAck frame 608. The Block Ack mechanism allows the originator 601 to have flexibility regarding the transmission of data MPDUs. The originator 601 may split the block of frames across TXOPs, separate the data transfer and the Block Ack exchange, and interleave blocks of MPDUs carrying all or part of MAC service data units (MSDUs) or aggregate MSDUs (A-MSDUs) for different TIDs or receiving station addresses (RAs).

Figure 7A:
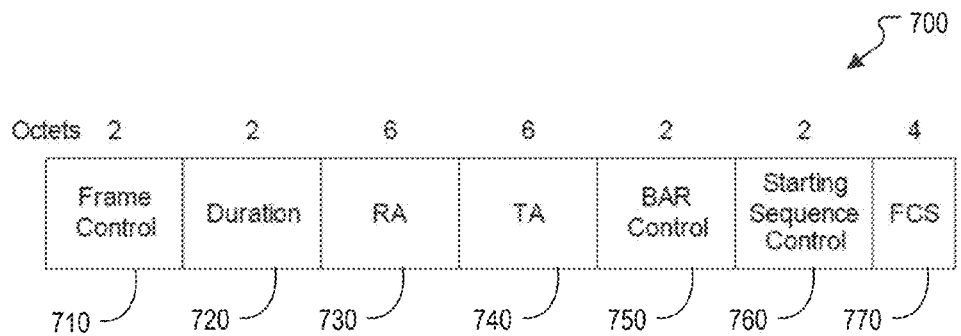
FIGS. 7A-7B illustrate examples of block acknowledgment request frames and components.
Figure 7B:
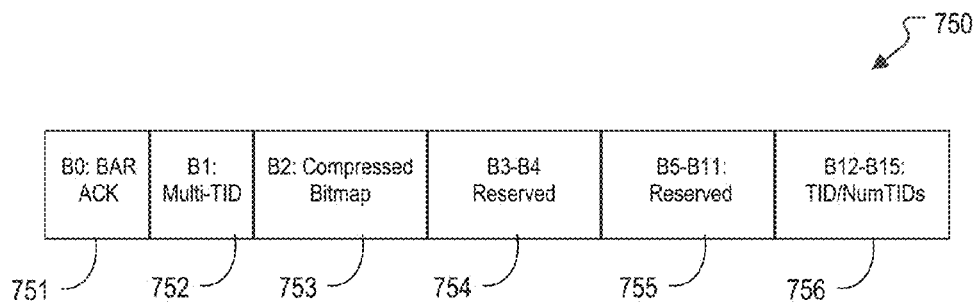
Figure 8:
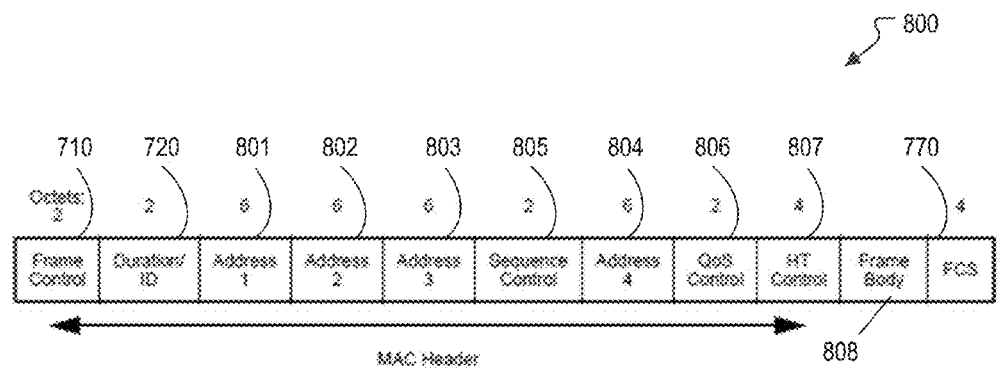
FIG. 8 illustrates an example of a data frame.
Figure 9:
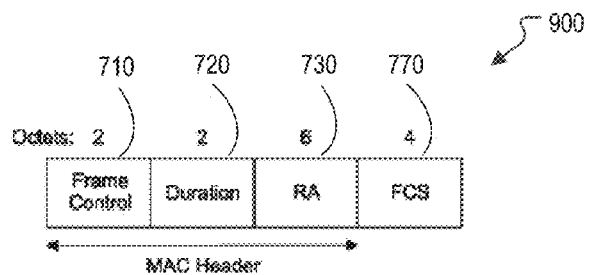
FIG. 9 illustrates an example of an acknowledgment (ACK) frame.
Figure 10:
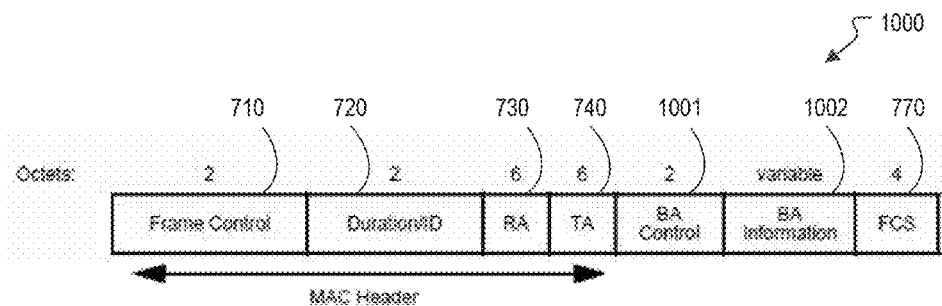
FIG. 10 illustrates an example of a block acknowledgment (BA) frame.

FIGS. 7A-7B and 8-10 illustrate schematic diagrams of examples of medium access control (MAC) layer frame formats. In one aspect, a MAC processor 211 generates the frames shown in these figures. In one aspect, each of the frames in FIGS. 7A-7B and 8 is a frame format for downlink. In one aspect, each of FIGS. 9 and 10 is a frame format for uplink.

In one aspect, FIGS. 7A-7B illustrate examples of block acknowledgment request frames and components. In FIG. 7A, a schematic diagram of an example of a block acknowledgment request (BAR) frame and underlying components is illustrated. The BAR frame 700 includes a frame control field 710, a duration field 720, a RA field 730, a transmitting station address (TA) field 740, a BAR control field 750, a starting sequence control field 760 and a frame check sequence (FCS) field 770.

In FIG. 7B, a schematic diagram of an example of a BAR control field and underlying components is illustrated. A BAR control field 750 is present within a BAR frame 700. The BAR control field 750 includes a BAR ACK field (or a BAR ACK policy field) 751, a multi-TID field 752, a compressed bitmap field 753, a first reserved field 754, a second reserved field 755 and a TID/NumTIDs field 756. The BAR ACK policy field 751 may be set to a value "0" or "1." In one aspect, the value "0" instructs a recipient to return an acknowledgment, and the value "1" is set when the originator does not require immediate acknowledgment.

FIG. 8 illustrates a schematic diagram of an example of a data frame. The data frame 800 includes the frame control field 710, the duration field 720, address fields 801-804, a sequence control field 805, a QoS control field 806, a high throughput (HT) control field 807, a frame body field 808 and the FCS field 770. The frame control field 710 includes 2 octets, the duration field 720 includes 2 octets, the address fields 801-804 each include 6 octets, the sequence control field 805 includes 2 octets, the QoS control field 806 includes 2 octets, the HT control field 807 includes 4 octets, the frame body field 808 includes a range of 0 to 7951 bits or a variable length and the FCS field 770 includes 4 octets. In FIG. 8, the data frame 800 includes at least a total of 40 octets (or 320 bits), but the length of the data frame 800 may vary depending on implementation. The number of octets in each field may vary depending on implementation.

FIG. 9 illustrates an example of an acknowledgment (ACK) frame. An acknowledgment frame 900 includes the frame control field 710, the duration field 720, the RA field 730 and the FCS field 770. In FIG. 9, the acknowledgment frame 900 includes a total of 14 octets (or 112 bits), but the length of the acknowledgment frame 900 may vary depending on implementation. In one or more implementations, the acknowledgment frame 900 includes the frame control field 710, the duration field 720 and the RA field 730.

FIG. 10 illustrates an example of a block acknowledgment (BA) frame. The block acknowledgment frame 1000 includes the frame control field 710, the duration field 720, the RA field 730, the TA field 740, a BA control field 1001, a BA information field 1002 and the FCS field 770. The block acknowledgment frame 1000 is substantially similar to the acknowledgment frame 900 aside from the addition of the TA field 740, the BA control field 1001 and the BA information field 1002. The TA field 740 includes 6 octets, the BA control field 1001 includes 2 octets and the BA information field 1002 includes a variable number of octets depending on implementation. In this regard, the block acknowledgment frame 1000 includes at least a total of 22 octets (or 176 bits) but the length of the block acknowledgment frame 1000 may vary depending on implementation. In one or more implementations, the block acknowledgment frame 1000 includes the frame control field 710, the duration field 720, the RA field 730 and the TA field 740.

Figure 11:
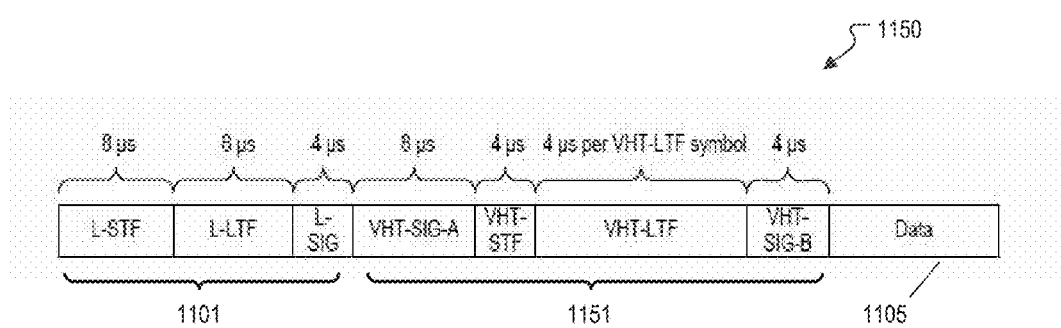
FIG. 11 illustrates a schematic diagram of an example of a very high throughput (VHT) frame format.

FIG. 11 illustrates an example of a very high throughput (VHT) frame format 1150, which is an example of a physical layer convergence procedure (PLCP) protocol data unit (or PPDU) format. In the VHT frame format 1150, packets of this format contain a legacy header 1101 composed of a legacy short training field (L-STF), a legacy long training field (L-LTF), and a legacy signal (L-SIG) field. The remainder of the packet includes a VHT specific portion 1151 composed of a VHT-SIG-A field, a VHT-STF field, a VHT-LTF field, and a VHT-SIG-B field. The VHT format 1150 also includes a data frame 1105.

FIGS. 12A-12B, 13A-13B and 14 show examples of downlink (DL) frames and uplink (UL) frames. In one aspect of the disclosure below, a downlink frame refers to a DL OFDMA frame, a HE DL OFDMA frame, a DL OFDMA PPDU, a HE DL OFDMA PPDU, DL PPDU, or vice versa. In one aspect, an uplink frame refers to a UL OFDMA frame, a HE UL OFDMA frame, a UL OFDMA PPDU, a HE UL OFDMA PPDU, a UL PPDU, a MU ACK frame, a MU ACK PPM, or vice versa. In one aspect, a PPDU refers to a HE PPDU or an OFDMA PPDU. In one aspect, a PPDU is a downlink frame (e.g., 1200) or an uplink frame (e.g., 1201).

In one or more aspects, a DL OFDMA frame (e.g., 1200) is sent to a set of STAs. After a predetermined time period (e.g., SIFS) after the receipt of the DL OFDMA frame, each STA of the same set of the STAs or each STA of a subset of the STAs replies with an individual ACK frame or BA frame in the form of a MU ACK frame (or a UL OFDMA PPDU 1201). In one aspect, a PHY processor 215 or a TX signal processing unit 280 generates the frames and their components shown in FIGS. 12A-12B, 13A-13B and 14.

In FIGS. 12A-12B, 13A-13B and 14, the horizontal dimension represents the time dimension or number of OFDM symbols, whereas the vertical dimension represents the frequency dimension, number of tones or number of sub-carriers. Note that for a given FFT size, the number of tones is given, however, depending on the sub-carrier spacing, two OFDM symbols with e.g., FFT=64 and FFT=256 would occupy the same bandwidth. In one or more implementations of the present disclosure, a sub-band refers to a set of contiguous tones or subcarriers that as a whole are assigned for a payload whose expected destination is a single STA, or a set of STAs. In one or more implementations, a sub-band is a horizontal partition of an OFDMA PPDU or frame where a set of contiguous tones for a contiguous set of OFDM symbols are designated for a given payload whose expected destination is a STA or a set of STAs.

Legacy STF/LTF/SIG (e.g., 1101) are several symbols based on an early design of an IEEE 802.11 specification. Presence of these symbols would make any new design compatible with the legacy designs and products. In one or more implementations, the legacy STF, LTF and SIG symbols are modulated/carried with FFT size of 64 on a 20 MHz sub-channel and are duplicated every 20 MHz if the DL OFDMA PPDU has a bandwidth wider than 20 MHz.

In one or more aspects, the HE SIG-A and HE SIG-B are symbols that carry control information that may be vital regarding each PSDU and regarding the radio frequency (RF), PHY and MAC properties of the PPDU. In the present disclosure, several fields are located either in HE SIG-A and/or HE SIG-B. The HE SIG-A and HE SIG-B can be carried/modulated using FFT size of 64 or 256 depending on implementation. In some aspects, the HE SIG-B is not present in all UL OFDMA PPDUs.

The HE STF and HE LTF are symbols used to perform necessary RF and PHY processing for each PSDU and/or for the whole PPDU. Depending on whether the HE STF/LTF symbols are beamformed, there may be two sets of such symbols.

FIGS. 12A-12B, 13A-13B and 14 illustrate schematic diagrams of examples of downlink and uplink frames in an OFDMA exchange among WLAN devices. With reference to these figures, in one or more implementations, OFDMA-based 802.11 technology is utilized, and for the sake of brevity, a STA refers to a non-AP HE STA, and an AP refers to a HE AP. In one or more aspects, a STA may act as an AP.

In FIGS. 12A-12B, 13A-13B and 14, a reference numeral 1200 is used for a DL OFDMA PPDU, a reference numeral 1209 is used for a payload section of a DL OFDMA PPDU, a reference numeral 1201 is used for a UL OFDMA PPDU, and a reference numeral 1214 is used for a payload section of a UL OFDMA PPDU, all for simplicity and convenience. These components with the same reference numerals have certain characteristics that are the same, but as different figures illustrate different examples, the same reference numeral does not indicate that a component with the same reference numeral has the exact same characteristics. While the same reference numerals are used for these components, examples of differences with respect to a component are described in connection with different figures.

In one aspect, a DL OFDMA PPDU 1200 is followed by a UL OFDMA PPDU 1201 after a predetermined time period (e.g., the SIFS 412) has elapsed. In one aspect, a DL OFDMA PPDU (e.g., 1200) includes a header (e.g., 1231 or 1301) and a payload (e.g., 1209). In one aspect, a UL OFDMA PPDU (e.g., 1201) includes a header (e.g., 1101 or 1233) and a payload (e.g., 1214).

In one aspect, a header is referred to as a preamble header, a preamble, a header section, or vice versa. For the sake of brevity, a header may refer to a component of a header. Thus, in one aspect, a header may refer to one or more headers (e.g., a header 1231 for headers 1101 and 1232; a header 1232 for headers 1202, 1203 and 1204; a header 1233 for headers 1101 and 1251; a header 1101 for legacy STF, LTF and SIG). In one aspect, a header is associated with a bandwidth of a PPDU. In one example, for a given bandwidth (e.g., 80 MHz) of a PPDU, a header is modulated on the entire bandwidth of the PPDU (e.g., entire 80 MHz). In another example, a header is modulated on a sub-channel (e.g., 20 MHz sub-channel) of the bandwidth (e.g., 80 MHz) and the modulated signal is duplicated on each of the remaining sub-channels (e.g., remaining three 20 MHz sub-channels) of the bandwidth.

In one aspect, a payload includes multiple payloads or PSDUs. The term PSDU refers to a PLCP service data unit. A PSDU for downlink (e.g., 1205) is associated with a sub-band of the bandwidth of its PPDU (e.g., 1200) and is modulated using the sub-band rather than the entire bandwidth of the PPDU. A PSDU for uplink (e.g., 1210) is associated with a sub-band of the bandwidth of its PPDU (e.g., 1201) and is modulated using the sub-band rather than the entire bandwidth of the PPDU. In one aspect, the modulation involves inverse Fourier transformation performed, for example, by an inverse Fourier transformer 284 in FIG. 3A.

A MU ACK frame in the form of an UL OFDMA PPDU 1201 includes ACK or BA frames from the STAs (e.g., STAs that receive and determine that an associated payload in the DL OFDMA PPDU 1200 has an ACK, policy field in the QoS control field 806 (FIG. 8) set to 00 or "Normal Ack or Implicit Block Ack Request"). For example, STA1 determines (e.g., detects, searches for, checks, acknowledges and/or verifies) the ACK policy field in the QoS control field 806 included in a PSDU payload 1205 of the DL OFDMA PPDU 1200 received by STA1.

Referring to FIG. 12A, in an example of operation, an AP (e.g., wireless communication device 111) transmits the DL OFDMA PPDU 1200 in a HE PPDU format. In one aspect, the HE PPDU format is comprised of a legacy header (e.g., the legacy PLCP 1101), a HE header (e.g., a HE PLCP 1232 comprising a HE SIG-A 1202, a HE STF/LTF 1203, a HE SIG-B 1204) and a payload section 1209 (e.g., PSDUs). In some aspects, the legacy PLCP 1101 consists of L-STF, L-LTF and L-SIG (see, e.g., L-STF, L-LTF and L-SIG in FIGS. 11A-11B). In one aspect, L-STF, L-LTF and L-SIG symbols are modulated with an FFT size of 64 on a 20 MHz sub-channel and the modulated symbols are duplicated on every 20 MHz sub-channel if the DL OFDMA PPDU 1200 has a bandwidth wider than 20 MHz.

In one or more implementations, a HE PLCP 1232 is composed of all or part of the HE SIG-A 1202, the HE STF/LTF 1203 (which are HE STF and HE LTF) and the HE SIG-B 1204. The HE SIG-A 1202 is modulated with an FFT size of 64 and duplicated on all of the 20 MHz sub-channels that the DL OFDMA PPDU 1200 consists of, if the DL OFDMA PPDU 1200 has a bandwidth wider than 20 MHz. The HE STF/LTF 1203 and the HE SIG-B 1204 are modulated with an EFT size of 256 and modulated over the entire bandwidth of the DL OFDMA PPDU 1200.

The payload section 1209 includes payloads (e.g., PSDUs) assigned to multiple STAs, and is modulated using an FFT size of 256. In this regard, the payloads are associated with STA1, STA2, STA3, and STA4. For example, the PSDU payload 1205 is associated with STA1, PSDU payload 1206 is associated with STA2, PSDU payload 1207 is associated with STA3, and PSDU payload 1208 is associated with STA4. The AP transmits the payloads through sub-bands of possibly varying bandwidth, and possibly non-contiguous sub-bands for STAs. In one aspect, each set of sub-bands is associated with its respective PSDU. In one aspect, each set of sub-bands is associated with its respective STA. In one aspect, the number of assigned sets of sub-bands is the same as the number of STAs. In FIG. 12A, the sub-bands assigned to STA1, STA2, STA3, and STA4 have equal bandwidth and the sub-bands are contiguous; however, the procedure described in the present disclosure does not require contiguous or equal bandwidth for sets of assigned sub-bands.

A DL OFDMA PPDU has a predetermined bandwidth, e.g., 20 MHz, 40 MHz, 80 MHz, 160 MHz, or 80+80 MHz (i.e., two 80 MHz). A sub-band is a portion of the bandwidth of a DL OFDMA PPDU. For example, when the bandwidth of a DL OFDMA PPDU is 20 MHz, and there are four STAs, each of the sub-bands associated with a respective one of the STAs is 5 MHz in bandwidth. When the bandwidth is 40 MHz, each of the four sub-bands associated with a respective one of the four STAs may be 10 MHz in bandwidth. When the bandwidth is 80 MHz, each of the four sub-bands associated with a respective one of the four STAs may be 20 MHz in bandwidth. These are merely examples, and the present disclosure is not limited to these examples. A bandwidth (e.g., 20 MHz, 40 MHz, 80 MHz, 160 MHz, or 80+80 MHz) of a DL OFDMA PPDU may be referred to as a DL bandwidth, a DL PPDU bandwidth, or an overall DL bandwidth. A bandwidth (e.g., 20 MHz, 40 MHz, 80 MHz, 160 MHz, or 80+80 MHz) of a UL OFDMA PPDU may be referred to as a UL bandwidth, a UL PPDU bandwidth, or an overall UL bandwidth. An overall bandwidth or an entire bandwidth may refer to a DL bandwidth or a UL bandwidth.

Upon the completion of the sequence of (a) the receipt of the DL OFDMA PPDU 1200 by the STAs and (h) the passing of the time period of the SIFS 412, each of the STAs that determines that its ACK policy field in the QoS Control field 806 of its PSDU (e.g., data frame) in the DL OFDMA PPDU 1200 is set to 00 or "Normal Ack or implicit Block Ack Request," transmits its ACK or BA frame simultaneously in the format of the UL OFDMA PPDU 1201 (which may be referred to as a MU ACK frame). The UL OFDMA PPDU 1201 is composed of the legacy PLCP 1101 and a payload section 1214, which are transmitted by all of the STAs that participate in forming the MU ACK frame.

In this example, each STA transmits its uplink frame that includes a header (e.g., a legacy PLCP 1101) and its acknowledgment frame (e.g., one of 1210, 1211, 1212 or 1213 associated with the STA). The UL OFDMA PPDU 1201 is an uplink frame that includes a header (e.g., a legacy PLCP 1101) and the acknowledgment frames (e.g., all of 1210, 1211, 1212 and 1213) from all of the STAs that participate in forming the MU ACK frame.

For example, STA1 generates and transmits a first uplink frame comprised of a legacy PLCP 1101 and an acknowledgment frame 1210 (e.g., an ACK or BA frame), STA2 generates and transmits a second uplink frame comprised of a legacy PLCP 1101 and an acknowledgment frame 1211 (e.g., an ACK or BA frame), STA3 generates and transmits a third uplink frame comprised of a legacy PLCP 1101 and an acknowledgment frame 1212 (e.g., an ACK or BA frame), and STA4 generates and transmits a fourth uplink frame comprised of a legacy PLCP 1101 and an acknowledgment frame 1213 (e.g., an ACK or BA frame). All of the first, second, third and fourth uplink frames are RF combined or aggregated to form a final uplink frame, which is the UL OFDMA PPDU 1201, for the AP. As all of the STAs are synchronized and transmit their respective uplink frames (e.g., the first, second, third and fourth uplink frames) at the same time (e.g., upon the completion of a predetermined time period of SIB 412), all of these frames are multiplexed simultaneously into the uplink frame 1201.

In one or more aspects, for an uplink frame, each STA (e.g., each of STA1, STA2, STA3 and STA4) generates a legacy PLCP 1101 utilizing the entire UL channel bandwidth. A legacy PLCP 1101 of a STA is associated with the entire UL channel bandwidth (rather than a sub-band). A legacy PLCP 1101 of a STA occupies the entire UL channel bandwidth. In one aspect, a STA modulates a legacy PLCP 1101 utilizing the entire UL channel bandwidth. For example, if the UL channel bandwidth is 80 MHz, a STA modulates the legacy PLCP with FFT size of 64 on a 20 MHz sub-channel and duplicates the modulated legacy PLCP on the remaining three 20 MHz sub-channels so that the legacy PLCP occupies the entire 80 MHz bandwidth.

In one or more aspects, each STA generates an acknowledgment frame (e.g., 1210, 1211, 1212, or 1213) utilizing a sub-band assigned to the STA (rather than the entire UL channel bandwidth). An acknowledgment frame of a STA is associated with a sub-band (rather than the entire channel bandwidth). An acknowledgment frame of a STA occupies a sub-band assigned to the STA. A sub-band is a portion of a UL channel bandwidth, and a STA modulates an acknowledgment frame utilizing a sub-band.

In one aspect, a baseband processor (e.g., a baseband processor 210 in FIG. 2, or more specifically, e.g., a MAC processor 211) of a STA can generate and provide an acknowledgment frame. In one aspect, a baseband processor (e.g., a baseband processor 210 in FIG. 2, or more specifically, e.g., a PHY processor 215 or a TX signal processing unit 280) of a STA can generate and facilitate transmission of an uplink frame directed to an AP.

In one aspect, the UL OFDMA PPDU 1201 has a bandwidth that is the same as the bandwidth of the preceding DL OFDMA PPDU 1200. The legacy PLCP 1101 (of each of the first, second, third and fourth uplink frames) is associated with the bandwidth of the UL OFDMA PPDU 1201. Likewise, the legacy PLCP 1101 of the UL OFDMA PPDU 1201 is associated with the bandwidth of the UL OFDMA PPDU 1201.

Each of the acknowledgment frames of the STAs is associated with its respective sub-band, where a sub-band is a portion of the bandwidth of the UL OFDMA PPDU 1201.

In some aspects, the legacy PLCP 1101 (of each of the first, second, third and fourth uplink frames and the UL OFDMA PPDU 1201) consists of the STF, the LTF and the SIG symbols, which are modulated with an FFT size of 64 on a 20 MHz sub-channel, and the modulated signal is duplicated every 20 MHz sub-channel if the UL OFDMA PPDU 1201 has a bandwidth wider than 20 MHz. A legacy PLCP 1101 thus utilizes the entire bandwidth (e.g., by duplication as described above).

In one aspect, the payload section 1214 has multiple payloads (e.g., PSDUs) for all of the STAs that participate in forming the MU ACK frame, and is modulated using an FFT size of 256. In this regard, a payload is associated with its respective one of STA1, STA2, STA3, and STA4. In FIG. 12A, the STA1, the STA2, the STA3 and the STA4 participate in forming the UL OFDMA PPDU 1201. For example, the ACK/BA payload 1210 is associated with STA1, ACK/BA payload 1211 is associated with STA2, ACK/BA payload 1212 is associated with STA3, and ACK/BA payload 1213 is associated with STA4.

FIG. 12B shows a similar exchange as in FIG. 12A except that the UL OFDMA PPDU 1201 has additional signaling between the legacy PLCP 1101 and the payload section 1214. In this regard, examples of differences are described in FIG. 12B for purposes of simplicity.

In this configuration, the UL OFDMA PPDU 1201 is comprised of not only the legacy PLCP 1101 and the payload section 1214 but also a partial HE PLCP. In one or more implementations, the partial HE PLCP consists of HE SIG-A 1251, which is modulated using an HT size of 64 and duplicated on all of the 20 MHz sub-channels that the UL OFDMA PPDU 1201 consists of. The HE SIG-A may be present either with multiple symbols or only with a first symbol reared to as a HE SIG-A1.

In one aspect, the content of a HE SIG-A field of a UL OFDMA PPDU 1201 from an intended STA is already known by the recipient (e.g., AP). In one aspect, the HE SIG-A is useful for unintended STAs to obtain some vital information about the frame and defer properly, and such information can be provided in HE SIG-A or the first symbol of the HE SIG-A. Examples of the above-mentioned vital information are: a) the duration of the uplink (MU UL) frame and in this the duration of MU ACK frame and (b) an indication whether there would be a (downlink) response frame to the uplink (MU UL) frame. Unintended STA(s) may be one or more STAs that are not intended (or required by the AP) to participate in forming a MU ACK frame; however, they may monitor the wireless medium in order to send their frame. Given the possibility of such unintended STAs, and given that HE SIG-A is encoded robustly so that it would be often decoded successfully; the above-mentioned vital information gives some information about the status of the medium to the unintended STAs.

In this example, the bandwidth of the DL OFDMA PPDU 1200 and the bandwidth of the subsequent UL OFDMA PPDU 1201 are the same. For example, the bandwidth may be 20 MHz where each of the sub-bands assigned to each STA has 5 MHz of bandwidth, or the bandwidth may be 80 MHz where each of the sub-bands has 20 MHz of bandwidth.

Examples of an operation of generating a downlink frame and an uplink frame are described below in connection with FIGS. 12A-12B.

In the process of forming the DL OFDMA PPDU 1200 and the UL OFDMA. PPDU 1201, a TXVECTOR parameter and a RXVECTOR parameter are employed (as described with reference to FIG. 2), each of which is denoted by a subcarriers list or a sub-band list (e.g., SUBCARRIERS_LIST or SUBBAND_LIST). The SUBCARRIERS_LIST is a scalar value that may be used in a HE OFDMA PPDU or a HE OFDMA PPDU with a partial PLCP or PHY header. In some aspects, the SUBCARRIERS_LIST in the TXVECTOR/RXVECTOR parameters is a set of scalar values where each scalar value indicates a set of sub-carriers, or equivalently a sub-band or set of sub-bands (where each sub-band is a set of sub-carriers).

In one or more implementations, a SUBCARRIERS_LIST is included in a TXVECTOR parameter, and a MAC processor 211 (FIG. 2) sends the TX VECTOR parameter with the SUBCARRIERS_LIST to a PHY processor 215 so that the PHY processor 215 can determine which set of sub-carriers (or set of sub-bands) is used to place the payload in a DL OFDMA PPDU 1200. In one or more implementations, a SUBCARRIERS_LIST may optionally be included in an RXVECTOR parameter, and a PHY processor 215 sends the RXVECTOR parameter with the SUBCARRIERS_LIST to a MAC processor 211 so that the MAC processor 211 can determine from which set of sub-carriers (or set of sub-bands) of the OFDMA PPDU 1201, the received payload 1214 was obtained.

In forming the UL OFDMA PPDU 1201 (or a MU ACK frame), each participating STA forms a frame in the form of a MU ACK frame, as follows: (a) the legacy PLCP, (b) the partial HE PLCP part (if utilized as shown in, e.g., FIG. 12B), and (c) a PSDU that is to be transmitted on a given sub-band. In this example, the legacy PLCP 1101 consists of the STF, LTF and SIG symbols modulated with an FFT size of 64 on a 20 MHz sub-channel and duplicated for every 20 MHz sub-channel if the immediately preceding DL OFDMA PPDU 1200 has a bandwidth wider than 20 MHz. In one aspect, the partial HE PLCP part consists of the HE SIG-A 1251 using an FFT size of 64 and duplicated on all of the 20 MHz sub-channels that the immediately preceding DL OFDMA PPDU 1200 consists of. The payload section 1214 includes PSDUs from participating STAs. A PSDU is a payload for a given STA, and is modulated using an FFT size of 256. Each participating STA forms a portion of the payload section 1214 with a PSDU in the sub-band (or sub-carrier) designated by the SUBCARRIERS_LIST of the immediately preceding DL OFDMA PPDU 1200. In one or more implementations, the MU ACK frame is formed without the partial HE PLCP part (e.g., the HE SIG-A 1251).

In one or more aspects, a legacy PLCP 1101 of a UL OFDMA PPDU 1201 (or a MU ACK frame) is formed as follows. All of the participating STAs that send an uplink frame that is in the form of a MU ACK frame, form the legacy PLCP 1101 (e.g., with an LET size 64 for the bandwidth of 20 MHz). In some aspects, if the immediately preceding DL OFDMA PPDU 1200 has a bandwidth of 40 MHz, then the legacy PLCP 1101 includes two identical parts over two 20 MHz channels for a total bandwidth of 40 MHz. In other aspects, if the immediately preceding DL OFDMA PPDU 1200 has a bandwidth of 80 MHz, then the legacy PLCP 1101 includes four identical parts for a total bandwidth of 80 MHz, in still other aspects, if the immediately preceding DL OFDMA PPDU 1200 has a bandwidth of 160 MHz or 80+80 MHz, then the legacy PLCP 1101 includes eight identical parts for a total bandwidth of 160 MHz.

The STF and LTF parts (also referred to as L-STF and L-LTF) of the legacy PLCP 1101 are formed according to the IEEE 802.11 specifications for HT and VHT compliant WLAN devices. The SIG part (also referred to as L-SIG) is encoded according to the 802.11 specifications for HT and VHT compliant WLAN devices.

In some instances, a STA generates and transmits to the AP an MU ACK frame whose length corresponds or is identical to the length of a frame eliciting the response. For example, in one or more implementations, a L_LENGTH parameter in the TXVECTOR parameter associated with the MU ACK frame is set to a corresponding value indicated in a MU ACK-L-LENGTH parameter of a HE control field (e.g., similar to the HT control field 807 of FIG. 8) of the immediately preceding DL OFDMA PPDU 1200. In one aspect, L_LENGTH is a length of a PSDU of a UL OFDMA PPDU 1201. In one or more implementations, a MUACK-L-LENGTH parameter is indicated in another part of the immediately preceding DL OFDMA PPDU 1200, such as in the HE SIG-A 1202 or the HE SIG-B 1204 symbol(s) of the immediately preceding DL OFDMA PPDU 1200. In some aspects, the L_LENGTH parameter in the TXVECTOR parameter associated with the MU ACK frame is set to a value corresponding to MUACKMaxLength. In one or more implementations, the MUACKMaxLength is a fixed value calculated based on a maximum possible length of a BA frame when modulated with MCS0 (e.g., BPSK at coding rate of ½) or MCS1 (e.g., QPSK at coding rate of ½). In some aspects, an AP (e.g., the wireless communication device 110 announces the parameter MUACKMaxLength during association. In other aspects, the AP announces the MUACKMaxLength in beacon frames. In some other aspects, the MUACKMaxLength parameter is set to a predetermined value (or a fixed value a priori), such that all of the STAs that participate in forming the MU ACK frame are configured to use identical values for the MUACKMaxLength parameter.

In one aspect, the partial HE PLCP part of the MU ACK frame that contains the HE SIG-A 1251, if present, is formed with an FFT size 64 for the bandwidth of 20 MHz. In some aspects, only the first symbol of the HE SIG-A 1251 symbols, sometimes referred to as WE SIG-A1, is present in the partial HE PLCP part of the MU ACK frame. In some aspects, if the immediately preceding DL OFDMA PPDU 1200 has a bandwidth of 40 MHz, then the partial HE PLCP part has two identical parts for a total bandwidth of 40 MHz. In other aspects, if the immediately preceding DL OFDMA PPDU 1200 has a bandwidth of 80 MHz, then the partial HE PLCP part has four identical parts for a total bandwidth of 40 MHz. In still other aspects, if the immediately preceding DL OFDMA PPDU 1200 has 160 MHz or 80+80 MHz, then the partial HE PLCP part would have eight identical parts for a total bandwidth of 160 MHz.

In some instances, a STA generates and transmits to the AP an MU ACK frame whose channel bandwidth corresponds or is identical to the channel bandwidth of a frame eliciting the response. For example, the encoding of different fields of the HE SIG-A 1251 may be with the same values that have been indicated in the immediately preceding DL OFDMA PPDU 1200. Particularly, parameters in the TXVECTOR parameter that are related to HE SIG-A 1251 are set to values that are a priori known. However, a channel bandwidth (CH_BANDWIDTH) parameter in the TXVECTOR parameter is set to the same value as the CH_BANDWIDTH in the RXVECTOR parameter associated with the immediately preceding DL OFDMA PPDU 1200. In this example, the CH_BANDWIDTH parameter may represent the channel width (20 MHz or 40 MHz) in which data is transmitted and the transmission format (e.g., HE PPDU format).

In one or more implementations, the fields in the HE SIG-A 1251 are encoded with a fixed value that the AP announces during association. The AP may announce the fixed value in beacon frames. Alternatively, the AP may announce the CH_BANDWIDTH parameter as fixed values such that STAs that participate in forming the MU ACK frame use identical values for all of the fields in the HE SIG-A 1251 symbols.

In some instances, a STA generates and transmits to the AP an MU ACK frame whose (H corresponds or is identical to the (if type of a frame eliciting the response. For example, in one or more implementations, in forming a HE PLCP and/or PSDU part of a MU ACK, frame, a participating STA (e.g., 210 or 211 of a STA) sets a GI_TYPE parameter in the TXVECTOR parameter associated with the MU ACK frame carried in the HE PPDU format (with partial PLCP or preamble header as described above) to a value corresponding to a counterpart GI_TYPE parameter in the RXVECTOR parameter of a frame eliciting the response. In some aspects, a STA (e.g., 210 or 211 of a STA) sets the GI_TYPE parameter in the TXVECTOR parameter associated with a MU ACK frame carried in the HE PPDU format (with partial PLCP or preamble header as described above) to a LONG_GI type, which indicates that short GI is not used in the packet. The GI_TYPE set to LONG_GI may be formed with an FFT size of 256. The LONG_GI parameter may include values such as 1.6 μs or 3.2 μs depending on implementation.

In UL OFDMA PPDU, there may be another symbol that is called HE LTF and its role is to assist the receiver to decode the payload. In FIGS. 12A, 12B, 13A, 13B, and 14, HE LTF is not shown for brevity. STA creates the portion of HE LTF that is associated with its assigned sub-band. HE LTF could be in various short or long formats; however, all the STAs need to use the same format for a single UL OFDMA PPDU. Hence, there are multiple embodiments in order to align the format of the HE LTF across all STAs.

In one or more implementations, all the STAs that respond with an ACK or BA frame in the form of an UL OFDMA PPDU shall choose the same HE LTF format (i.e., long HE LTF or compressed HE LTF) and construct the HE LTF according to this format indication. In one embodiment, the format may be indicated by the AP in the preceding DL OFDMA PPDU or DL MU PPDU (for example in the HE SIG-B symbol of DL PPDU) and all the STAs pick this indicated format to construct the HE LTF symbol of the UL OFDMA PPDU. In another embodiment, each STA shall use the same HE LTF format as in the preceding DL OFDMA PPDU or DL MU PPDU. In other words, if the preceding DL OFDMA PPDU or DL MU PPDU utilizes a long HE LTF format then each STA shall use a long HE LTF format to construct the HE LTF symbol in the UL OFDMA PPDU, and if the preceding DL OFDMA PPDU or DL MU PPDU utilizes a compressed HE LTF format then each STA shall use a compressed HE LTF format to construct the HE LTF symbol in the UL OFDMA PPDU. In another embodiment, the STAs may use a pre-determined format and construct the HE LTF symbol of UL OFDMA frame. There are multiple ways that such pre-determined format may be communicated. For instance, the wireless devices may have such a pre-determined duration value defined/set during manufacture. In another instance, the AP may announce such pre-determined format to each STA during association time. In another instance, the AP may periodically announce such pre-determined format in Beacon frames. In another instance, the AP may use a combination of above methods to announce such pre-determined format and change the value if necessary and re-announce it to its associated STAs.

In some instances, a STA generates and transmits to the AP an MU ACK frame whose format, number of transmit chains, and/or coding type corresponds or is identical to the format, number of transmit chains, and/or coding type of a frame eliciting the response. For example, in some aspects, a participating STA sets a FORMAT parameter in the TXVECTOR parameter associated with the LTF: OFDMA PPDU 1201 to a value representing HE while the STA sets a N_TX parameter in the TXVECTOR parameter to one, among others. In this example, the N_TX parameter indicates the number of transmit chains. In some implementations, the STA sets a FCC_CODING parameter in the TXVECTOR parameter to BCC_CODING (e.g., binary convolutional code encoding).

In one or more implementations, a STA sets a MCS parameter in the TXVECTOR parameter to a value of zero (e.g., MCS0). In some instances, a STA generates and transmits to the AP an MU ACK frame whose MCS is identical to the MCS of a frame eliciting the response. For example, some aspects, a STA sets the MCS parameter to a value corresponding to a MUACK-MCS parameter indicated by the AP in the immediately preceding DL OFDMA PPDU 1200. The MUACK-MCS parameter may be indicated in the MUACK-MCS field of the HE control field (e.g., see HT control field 807) of the immediately preceding DL OFDMA PPDU 1200. The AP may announce the MUACK-MCS parameter during association or in beacon frames. In some aspects, the AP sets the MUACK-MCS parameter to a fixed value a priori, such that all of the STAs that participate in forming the MU ACK frame use identical values for the MUACK-MCS parameter.

In forming a PSDU part of the MU ACK frame, the sub-bands in the MU ACK frame that a participating STA uses to place associated PSDUs are based on of the following examples. In some aspects, the STA uses identical sub-bands from the immediately preceding DL OFDMA PPDU 1200 that convey the payload for the STA. In other words, a STA that intends to send an MU ACK frame sets the SUBCARRIERS_LIST of the TXVECTOR parameter for the MU ACK frame to the same value as in the SUBCARRIERS_LIST of the RXVECTOR parameter of the immediately preceding DL OFDMA PPDU 1200. In this example, the SUBCARRIERS_LIST in the TXVECTOR parameter uniquely identifies the set of sub-carriers or equivalently the sub-bands that the STA uses.

FIG. 13A illustrates a schematic diagram of an example of a downlink frame and an uplink frame for an OFDMA exchange among WEAN devices. In this case, the DL OFDMA PPDU 1200 includes a header section 1301 comprised of the legacy PLCP 1101, the HE SIG-A 1202, the HE STF/LTF 1203 and the HE SIG-B 1204. The payload section 1209 contains multiple PSDU payloads where PSDU 1302 is associated with STA1, PSDU 1303 is associated with STA2, PSDU 1304 is associated with STA3, PSDU 1305 is associated with STA4 and PSDU 1306 is associated with STA5. The UL OFDMA PPDU 1201 includes the legacy PLCP 1101 and the payload section 1214. The payload section 1214 includes multiple ACK/BA payloads where ACK/BA payload 1307 is associated with STA1, ACK/BA payload 1308 is associated with STA2, ACK/BA payload 1309 is associated with STA3, ACK/BA payload 1310 is associated with STA4, and ACK/BA payload 1311 is associated with STA5.

In this case, a similar exchange as in FIG. 12A is illustrated except that the STAs that receive payloads in the DL OFDMA PPDU 1200 do not all have the same sub-band bandwidths. For example, the overall (or entire) bandwidth of DL OFDMA PPDU 1200 (or UL OFDMA PPDU 1201) may be 40 MHz, where each of the three STAs (e.g., each of STA3, STA4 and STA5) has a sub-band with 10 MHz bandwidth, and each of the two STAs (e.g., each of STAT and STA2) has a sub-band with 5 MHz bandwidth. In this example, each STA responds with an ACK or a BA frame in the same sub-band that the STA has received its payload in the DL OFDMA PPDU 1200 after the SIFS 412 has elapsed. Note that due to different sizes of the sub-bands, one or more of the STAs may need to pad the respective one or more payloads for the ACK or BA frame so that all of the PSDUs formed by the participating STAs in the payload section 1214 have an equal time duration. By having the STAs respond with the same sub-band bandwidth as the downlink sub-band bandwidth, the amount of processing and/or overhead may be minimized during the generation of the UL OFDMA PPDU 1201 thereby increasing efficiency in the overall acknowledgment mechanism.

FIG. 13B illustrates a schematic diagram of an example of a downlink frame and an uplink frame for an OFDMA exchange among STAs. In this case, the exchange is similar to FIG. 12A and FIG. 13A, except that the STAs that receive payloads in the DL OFDMA PPDU 1200 do not all have the same sub-band bandwidths and one of the STAs does not respond with an ACK or BA, for example, because the corresponding ACK policy field in the QoS Control field 806 of the DL OFDMA PPDU 1200 is not set to "Normal Ack or Implicit Block Ack Request", because the DL PSDU has been received by the STA in error, or because there has been an error or failure in receipt. For example, STA3 does not transmit an uplink frame with an ACK or BA for the UL OFDMA PPDU 1201 because, among others, the STA3 determines that it is instructed not to participate in forming a MU ACK frame (e.g., STA3 did not find the ACK, policy field identifying the STA3 as a participant in the MU ACK frame formation), or the associated PSDU (e.g., PSDU payload 1304) has been received in error by the STA3. A PSDU payload may not be received by the corresponding STA due to one or more reasons, including but not limited to, the PSDU was corrupted during transmission, the transmission was impacted by interference, the QoS control field 806 indicated that the ACK policy field was not set for MU ACK participation, etc.

In one or more implementations, the AP does not detect that there is a missing PSDU in one or more received sub-bands assigned to the corresponding STAs, e.g., STA3, and may process the received signal (e.g., the UL OFDMA PPDU 1201). However, after processing the PSDU in the sub-band location and obtaining the frame check sequence (FCS), the AP (e.g., 210 or 211 of the AP) can identify that neither ACK nor BA is present in the sub-band location. In this regard, and if the AP originally had not set the QoS Control field of the DL OFDMA PPDU to "Normal Ack or implicit Block Ack Request", the AP can determine that the corresponding PSDU (e.g., 1304) would need to be retransmitted for the associated STA (e.g., STA3), and the AP may retransmit the DL OFDMA PPDU that contains the PSDU 1304.

Figure 14:
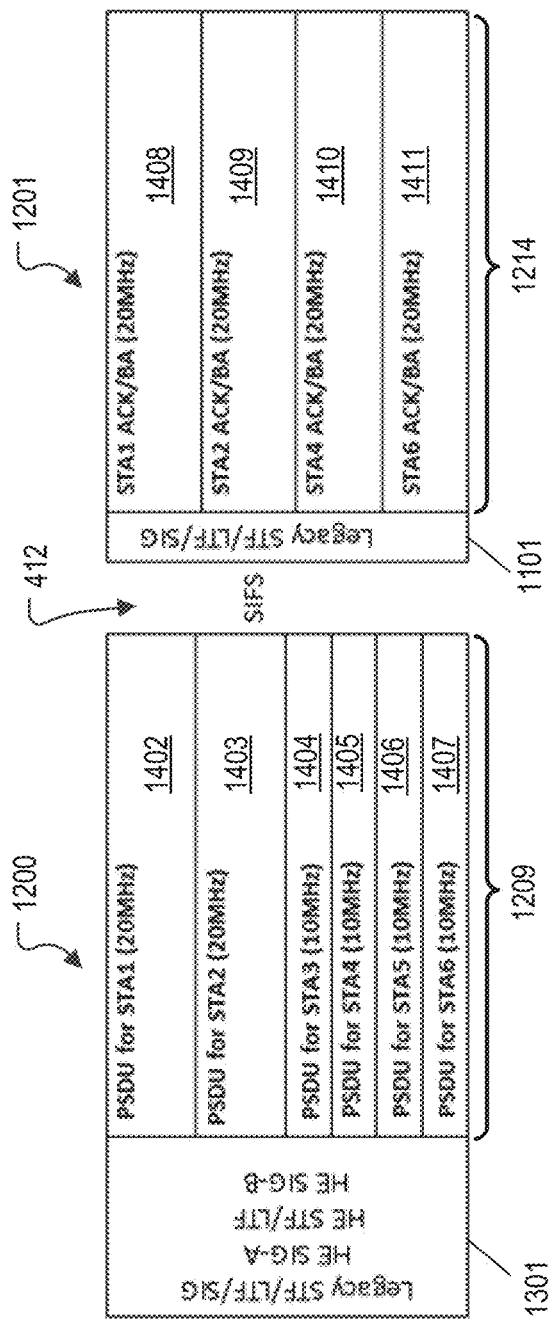
FIG. 14 illustrates a schematic diagram of a fifth example of a downlink frame and an uplink frame.

FIG. 14 illustrates a schematic diagram of an example of a downlink frame and an uplink frame for an OFDMA exchange among WLAN devices. A similar exchange as in FIG. 12A is illustrated in FIG. 14 except that the STAs that receive payloads in the DL OFDMA PPDU 1200 do not all have the same sub-band bandwidths. Because FIG. 14 has similar features to those illustrated in FIGS. 12A and 13A, only examples of differences are discussed for purposes of clarity and simplicity.

In this case, the DL OFDMA PPDU 1200 includes a header section 1301 comprised of the legacy PLCP 1101, the HE SIG-A 1202, the HE STF/LTF 1203 and the HE SIG-B 1204. The payload section 1209 contains multiple PSDU payloads where PSDU 1402 is associated with STA1, PSDU 1403 is associated with STA2, PSDU 1404 is associated with STA3, PSDU 1405 is associated with STA4, PSDU 1406 is associated with STA5 and PSDU 1407 is associated with STA6. Here, each of the PSDUs 1402 and 1403 has a sub-band with 20 MHz bandwidth while each of the remaining PSDUs 1404-1407 has a respective sub-band with 10 MHz bandwidth.

The UL OFDMA PPDU 1201 includes a legacy PLCP 1101 and a payload section 1214. The payload section 1214 includes multiple ACK/BA payloads where ACK/BA payload 1408 is associated with STA1, ACK/BA payload 1409 is associated with STA2, ACK/BA payload 1410 is associated with STA4 and ACK/BA payload 1411 is associated with STA6. In this example, each of the ACK/BA payloads 1408-1411 has a sub-band with 20 MHz bandwidth.

In this example, the bandwidth of the DL OFDMA PPDU 1200 and the bandwidth of the subsequent MU ACK frame 1201 are the same; however, in some situations the bandwidths may be different. Not all of the STAs, which have an associated payload in the DL OFDMA PPDU 1200, respond with an ACK or BA frame, and some of STAs are not expected, or not instructed, to respond since the corresponding ACK policy field in the QoS control field 806 is not set to "Normal Ack or Implicit Block Ack Request." In addition, the sub-bands, where the ACK/BA frames of the responding STAs are placed within the payload section 1214, are assigned to the STAs in a predetermined manner, which may be different from the received order of the sub-bands in the immediately preceding DL OFDMA PPDU 1200. For example, the set of sub-bands allocated for the ACK/BA frames of the participating STAs is signaled by indexing in the immediately preceding DL OFDMA PPDU 1200.

In one or more implementations, a SUBCARRIERS_LIST is a predetermined list (a priori) known to the AP and all STAs. In this case, the SUBCARRIERS_LIST represents a listing of index values, where each index value represents a corresponding sub-band allocation for a subsequent acknowledgment frame. As such, the AP would only need to indicate an index of the SUBCARRIERS_LIST in order to assign a particular sub-band to a STA. In some aspects, this indication by the AP is generated and placed in the HE SIG-A 1202 or the HE SIG-B 1204 symbols of the immediately preceding DL OFDMA PPDU 1200. In turn, the STA then sets the SUBCARRIERS_LIST in the TXVECTOR parameter of the MU ACK frame based on the received indication. In such implementations, the STA is responding with a MU ACK frame containing the ACK or BA frame of that STA. Such indexing could be signaled in HE SIG-B symbol of the preceding DL OFDMA PPDU, where the AP indicates the sub-band assignment within the DL OFDMA or DL MU frame and additionally indicates the sub-band index for the upcoming ACK or BA frame within the UL OFDMA frame. For the STA(s) that no immediate ACK or BA is expected, i.e., the QoS Control field of the DL OFDMA PPDU is not set to "Normal Ack or Implicit Block Ack Request," a reserved value such as sub-band zero is signaled, indicating that no sub-band is assigned.

It should be noted that the term MU ACK frame as used in the preceding sentence refers to an uplink frame generated by one STA, and such uplink frame comprises a header (e.g., 1101) and one PSDU (e.g., 1408), where the PSDU is associated with that STA and is associated with its corresponding sub-band. Such uplink frame is in a "form" of a MU ACK frame but does not include PSDUs from other STAs. Thus, in such a situation, a MU ACK frame may refer to an uplink frame (comprising a header and one PSDU) generated by one STA to participate in forming the ultimate MU ACK frame (e.g., 1201) through RF combination, in another case, the term MU ACK frame may refer to the ultimate uplink frame (e.g., 1201), which is formed by aggregating and multiplexing multiple uplink frames from multiple STAs. In this latter case, the MU ACK frame (e.g., 1201) comprises a header and multiple PSDUs. Therefore, the term MU ACK frame should be understood in context, and it may refer to an uplink frame generated by one STA to participate in forming the ultimate MU ACK frame, or it may refer to the ultimate uplink frame formed by aggregating multiple uplink frames generated by multiple STAs.

In one or more aspects, STAs transmit their respective uplink frames at the same time, and these uplink frames are RF combined or aggregated to form a single, ultimate uplink frame (or a single, ultimate MU ACK frame). The AP receives and detects this single, ultimate MU ACK frame.

In some implementations, a STA obtains a MUACK-Sub-band parameter from the HE SIG-A 1202 or HE SIG-B 1204 symbols of the immediately preceding DL OFDMA PPDU 1200. In this regard, the STA then sets the SUBCARRIER-S_LIST parameter in the TXVECTOR parameter of the MU ACK frame with a value corresponding to the obtained MUACK-Sub-band parameter. In such implementations, the AP (e.g., 210 or 215 of an AP) sets the MUACK-Sub-band field in the HE SIG-A 1202 or the HE SIG-B 1204 symbol of the DL OFDMA PPDU 1200 to a value that would represent the sub-band allocation for that STA in a subsequent MU ACK frame. In other implementations, the STA (e.g., 210 or 211 of the STA) obtains the MUACK-Sub-band parameter from the RXVECTOR parameter of the immediately preceding DL OFDMA PPDU 1200.

In one or more implementations, if the AP (e.g., 210 or 211 of an AP) does not set the ACK policy field in the QoS control field 806 to "Normal Ack or Implicit Block Ack Request," then the AP (e.g., 210 or 215 of an AP) sets the MUACK-Sub-band field in the HE SIG-A 1202 or HE SIG-B 1204 symbol of the DL OFDMA PPDU 1200 to an invalid or reserved value, which implies that the receiving STA does not have a sub-band allocated for sending an ACK, or BA in the next MU ACK frame.

On the other hand, if the AP (e.g., 2110 or 211 of an AP) sets the ACK policy field in the QoS control field 806 to "Normal Ack or Implicit Block Ack Request" of the frame e.g., PSDU payload) that is carried for a STA, then the AP (e.g., 210 or 215 of an AP) sets the MUACK-Sub-band field in the HE SIG-A 1202 or the HE SIG-B 1204 symbol in the DL OFDMA PPDU 1200 to a valid value, which represents a sub-band having been allocated for the ACK or BA frame of that STA.

In one or more implementations, the MUACK-Sub-band parameter included in the HE SIG-A 1202 or the HE SIG-B 1204 symbol of the DL OFDMA PPDU 1200, which may carry respective payloads intended for two STAs, is not set to the same value unless the ACK policy field in the QoS control field 806 of the associated frames carried to the two STAs are different than "Normal Ack or Implicit Block Ack Request." The size of the MUACK-Sub-band field may vary depending on implementation, but the size may be set to index all of the allocated sub-bands within a given PPDU bandwidth. For instance, for sub-bands where each sub-band has a bandwidth of 5 MHz, the MUACK-Sub-band field has 2-bit length fir PPDUs with 20 MHz bandwidth, has 3-bit length for PPDUs with 40 MHz bandwidth, has 4-bit length for PPDUs with 80 MHz bandwidth, and has 5-bit length for PPDUs with 160 MHz bandwidth.

In some aspects, an implicit indication is used instead of the MUACK-Sub-band parameter to inform each STA which sub-band has been assigned to that STA for placing a corresponding ACK/BA frame.

In one aspect, an AP may identify the number and position of the sub-bands that are allocated for MU ACK frame transmission. This implicit indication may be generated within the HE SIG-B 1204 field of the DL OFDMA PPDU 1200 (by, e.g., a PHY processor 215), where the indication relates to an identification of the number of sub-bands. Note that actual location of the sub-bands may be known a priori by the AP and the STAs, given the bandwidth of the MU ACK frame. For instance, the MU ACK frame may have a 20 MHz bandwidth with nine sub-bands (where each sub-band has a 2 MHz bandwidth), or four sub-bands (where each sub-band has a 4 MHz bandwidth). In this regard, so long as the number of acknowledgment frames (which from the above example is either 9 or 4), or alternatively the bandwidth of acknowledgment sub-bands, is specified by the AP (e.g., by its baseband processor) in the DL OFDMA PPDU 1200, the STAs would be notified of the location of the sub-bands and corresponding order.

In some aspects, the order may be determined by some convention such as the sub-band with lowest frequency (or smallest sub-carrier or sub-band identification) is assigned index 1, and other sub-bands have an index incremented from index 1. For instance, the MU ACK, frame has four sub-bands and, based on a predetermined convention between the AP and STAs, the top sub-band is indexed 1, and the next sub-band is indexed 2, etc., and the bottom sub-band is indexed 6.

Alternatively, the number of sub-bands for ACK/BA frames may be known a priori. For instance, if the AP expects to receive the MU ACK frame with a 20 MHz bandwidth, and each sub-band is expected to have a respective 2 MHz bandwidth, then such a priori convention between the AP and the STAs implicitly identifies the number of sub-bands for ACK/BA multiplexing. Similarly, an implicit order of the sub-bands may be understood between the AP and the STAs.

Once the number of the sub-bands for ACK/BA multiplexing and an inherent order of the sub-band are known between the AP and the STAs, then each STA can select the ACK/BA sub-band that has the same index/order as the index/order assigned to the payload of the STA via the HE SIG-B 1204 of the preceding DL OFDMA PPDU 1200. For instance, the MU ACK frame has four sub-bands where the sub-bands from top to bottom are indexed 1, 2, 3 and 4 respectively. The STA whose sub-band assignment in the preceding DL OFDMA PPDU 1200 is listed first would use the ACK/BA sub-band with index 1 in the MU ACK frame.

The STA whose sub-band assignment in the preceding DL OFDMA PPDU 1200 is listed second would use the ACK/BA sub-hand with index 2 in the MU ACK frame. The STA whose sub-band assignment in the preceding DL OFDMA PPDU 1200 is listed third would use the ACK/BA sub-band with index 3 in the MU ACK frame. Finally, the STA whose sub-band assignment in the preceding DL OFDMA PPDU 1200 is listed fourth would use the ACK/BA sub-band with index 4 in the MU ACK frame.

In another embodiment, each STA uses one of the sub-bands among the set of sub-bands that is assigned to the STA in the preceding DL OFDMA PPDU. For instance, each STA may use the first sub-band with a given bandwidth (e.g., 2 MHz, or 4 MHz or 5 MHz) from the sub-bands that has been assigned to the STA in the preceding DL OFDMA PPDU. In another embodiment, each STA may use the first 2 MHz sub-band from the sub-bands that has been assigned to the STA in the preceding DL OFDMA PPDU. In another embodiment, each STA may use the first 4 MHz sub-band from the sub-bands that has been assigned to the STA in the preceding DL OFDMA PPDU, and if a STA has a narrower sub-band in the preceding DL OFDMA PPDU, then the STA chooses the same sub-band as in the preceding DL OFDMA sub-band. The AP would either indicate that the 2 MHz or 4 MHz sub-band designation for ACK and BA frames within a UL OFDMA PPDU, or in the preceding DL OFDMA PPDU, or broadcasted within Beacon frames, or let each STA know about such designation during association time.

Note that while the bandwidth of the UL OFDMA PPDU 1201 may be the same as the DL OFDMA PPDU 1200, the bandwidth of the UL OFDMA PPDU 1201 may be narrower than the bandwidth of the DL OFDMA PPDU 1200. For example, while a DL OFDMA PPDU 1200 has a bandwidth of 80 MHz (e.g., primary 40 MHz and secondary 40 MHz), the UL OFDMA PPDU 1201 may have a bandwidth of 40 MHz only (e.g., primary 40 MHz only). In some aspects, the AP establishes the bandwidth of the MU ACK frame in advance such that the participating STAs are notified of the bandwidth prior to formation of the MU ACK frame. In some examples, the bandwidth of the MU ACK frame may be fixed to a bandwidth of 20 MHz irrespective of the bandwidth of the DL OFDMA PPDU 1200. In other examples, the bandwidth of the MU ACK frame may be fixed to 40 MHz when the DL OFDMA PPDU 1200 has a bandwidth of 40 MHz or more.

In one or more implementations, the indication of the bandwidth for the MU ACK frame may be performed in one of the following ways: (a) the UL bandwidth may be identified by an indication to all of the STAs either in beacon frames or during association time, or (b) the UL bandwidth may be identified in each DL OFDMA frame within the HE SIG-A 1202 or the HE SIG-B 1204. In some implementations, where the bandwidth for all of the sub-bands assigned to ACK or BA frame have been identified to be the same, the total number of the sub-bands for ACK/BA multiplexing is given as part of the indication.

In some implementations, the AP (e.g., 210 or 211 of the AP) partitions the sub-bands for a MU ACK frame such that multiple relatively narrow sub-bands are assigned to ACK frames while multiple relatively wider sub-bands are assigned to BA frames. For example, a sub-band for an ACK frame is narrower than a sub-band for a BA frame. This is due to the fact that the ACK frame is typically shorter than a BA frame. Information relating to such partition may be announced by the AP during association time or in Beacon frames. For instance, in a ML ACK frame with 20 MHz bandwidth, the AP may assign two sub-bands (each sub-band with 4 MHz bandwidth) for BA frames, and five sub-bands (each sub-band with 2 MHz bandwidth) for ACK frames. Such partitioning may allow for more efficient MU ACK frame transmission.

If a BA frame, which is carried as a portion of a payload of a HE OFDMA PPDU (e.g., UL OFDMA PPDU 1201), is sent as an immediate response to an implicit BA request, the MU ACK frame (which contains the BA frame) is transmitted with a certain GI value set according to the GI_TYPE value of the RXVECTOR parameter in the immediately preceding DL OFDMA PPDU 11200. The rate and bandwidth of the BA frame may be selected based on the CODING, MCS, GI parameters of the RXVECTOR parameter of the DL OFDMA PPDU 1200, such that the received parameter values are transferred to counterpart parameters in the TXVECTOR parameter of the MU ACK frame.

Similarly, if an ACK frame is sent as an immediate response to an implicit ACK, request, the MU ACK frame (which contains the ACK frame) is transmitted with a certain GI value set according to the GI_TYPE value of the RXVECTOR, parameter in the immediately preceding DL OFDMA PPDU 1200. The rate and bandwidth of the ACK frame may be selected based on the CODING, MCS, GI parameters of the RXVECTOR parameter of the DL OFDMA PPDU 1200, such that the received parameter values are used to set the counterpart parameters in the TXVECTOR parameter of the MU ACK frame.

In operation, while the AP, for example, receives an MU ACK frame transmitted in the HE PPDU format, the AP (e.g., 210 or 211 of an AP) may obtain the SUBCARRIERS_LIST from the RXVECTOR parameter of the UL OFDMA PPDU 1201 to identify which STA has responded with an ACK or BA frame. The AP (e.g., 210 or 211 of an AP) may compare the SUBCARRIERS_LIST from the RXVECTOR parameter of the UL OFDMA PPDU 1201 with the SUBCARRIERS_LIST of a preceding HE OFDMA PPDU (e.g., DL OFDMA PPDU 1200), and identify which of the STAs has participated in forming the MU ACK frame.

With respect to ACK frames, the AP may not be able to determine which STA has sent an ACK frame since ACK frames do not contain a TA field (but a BA frame contains the TA field). In this regard, the ACK frame only has the RA address (e.g., the RA field 730). However, in some implementations where the SUBCARRIERS_LIST of the TXVECTOR parameter of a HE OFDMA PPDU (e.g., 1200) and the SUBCARRIERS_LIST of the TXVECTOR parameter of the immediately following MU ACK frame (e.g., 1201) are intended to be the same for each STA that receives a payload in the HE OFDMA PPDU and participates in forming the MU ACK frame, the AP can compare and verify the presence of SUBCARRIERS_LIST in the RXVECTOR parameter of the received MU ACK frame (e.g., 1201), and if not present, the AP infers that the STA with the given SUBCARRIERS_LIST (in the DL OFDMA and MU ACK exchange) has not sent an ACK, frame, and if a ACK frame is present in the given SUBCARRIERS_LIST of the received MU ACK frame and if the frame is ACK, then AP can further infer which STA has sent the ACK frame. (See, e.g., FIG. 13A). In some embodiments, the PHY entity/layer (e.g., 215) indicates to the MAC entity/layer (e.g., 211) whether any eligible signal (i.e., a signal that is processed and decoded by the PHY entity correctly) is detected in a sub-band or not by setting an RXVECTOR parameter (denoted by SUBBAND-OCCUPIED), which can take values TRUE or FALSE. When the PHY entity does not sense any eligible signal in a specific sub-band of a received frame, the PHY entity may set the RXVECTOR parameter SUB- BAND-OCCUPIED to FALSE. In such case, some other RXVECTOR parameters (e.g., RXVECTOR parameter MCS, NSS, LENGTH, etc) may take reserved/preconfigured values (based on such indication the MAC entity may disregard these reserved/preconfigured values). When the PHY entity senses an eligible signal in a specific sub-band of a received frame, the PHY entity may set the RXVECTOR parameter SUBBAND-OCCUPIED to TRUE. In some embodiments, the RXVECTOR parameter SUBBAND-OCCUPIED is prepared for each possible sub-band defined for the received bandwidth of the frame (e.g., each 2 MHz sub-band and/or each 4 MHz sub-band, etc). In some other embodiments, the RXVECTOR parameter SUBBAND-OCCUPIED is prepared for the sub-bands that were indicated by the TXVECTOR of the preceding frame sent by the STA. In some other embodiments, the RXVECTOR parameter SUBBAND-OCCUPIED is prepared for some specific sub-bands that are specifically identified by some parameters of the TXVECTOR of the preceding frame sent by the STA.

In an example, the SUBCARRIERS_LIST of a DL OFDMA PPDU (e.g., 1200) and the SUBCARRIERS_LIST of a UL OFDMA PPDU (e.g., 1201) are expected to be the same, and the expected SUBCARRIERS_LIST has index 1, 2 and 3. If index 3 is not present in the SUBCARRIERS_LIST of the received UL OFDMA PPDU (e.g., 1201), then an AP (e.g., 210 or 211) infers that the STA associated with index 3 has not sent an acknowledgment frame.

The PHY-DATA.indication primitive may be generated by the PHY entity for the local MAC entity to indicate that the receiving channel state machine has completed a reception with or without errors. When a signal extension is detected in the received UL OFDMA frame, the primitive is generated at the end of the signal extension.

A number of error conditions may occur after a state machine on the receiving channel of the PHY processor 215 has detected what appears to be a valid preamble and start frame delimiter (SFD). In some aspects, an RXERROR parameter conveys one or more of the following parameters returned for each of those error conditions: (a) NoError: indicates that no error occurred during the receive process in the PHY, (b) FormatViolation: indicates that the format of the PPDU was received in error; (c) CarrierLost: indicates that during the reception of the incoming PSDU, the carrier was lost and no further processing of the PSDU can be accomplished; (d) UnsupportedRate: indicates that during the reception of the incoming PPDU, a nonsupported date rate was detected; (e) Filtered: indicates that during the reception of the PPDU, the PPDU was filtered out due to a condition set in a PHYCONFIG_VECTOR parameter.

In the case of an RXERROR value of NoError, the MAC processor 211 uses a PHY-RXEND.indication primitive as reference for channel access timing. The effect of receipt of the PHY-RXEND.indication primitive is for the MAC processor 211 to begin inter-frame space (IFS) processing.

The RXVECTOR represents a list of parameters that the PHY processor 215 provides to the MAC processor 211 upon receipt of a valid PHY header or upon receipt of the last PSDU data bit in the received UL OFDMA frame. In some aspects, the RXVECTOR is an included parameter only when dot11RadioMeasurementActivated is true. The RXVECTOR may contain both MAC and MAC management parameters.

Now referring to FIGS. 1, 2, 3A-3B, 7A-7C, 8-10, 12A-129, 13A-13B and 14, in one or more aspects, a downlink is directed from at least one STA (e.g., an AP 111) to a plurality of STAs (e.g., 112-115), and an uplink is directed from the plurality of STAs (e.g., 112-115) to at least one STA (e.g., AP 111).

In one aspect of downlink, a processor (e.g., a baseband processor 210 or a MAC processor 211) of an AP generates and provides, to a PHY processor 215 or a TX signal processing unit 280, a plurality of MAC frames. Each of the MAC frames includes a request for acknowledgment (e.g., BAR frame 700 or 780 including a BAR ACK policy field 751, or a data frame 800 including an ACK policy field a QoS control field 806) associated with a respective one of the plurality of STAs. In one aspect, a request for acknowledgment includes an acknowledgment control (e.g., 751 or 806) relating to acknowledgment participation by a corresponding STA. In one aspect, the acknowledge control provides an instruction for a STA to participate in forming a MU ACK frame (e.g., instructs the STA to generate the STA's respective acknowledgment frame that becomes a part of the MU ACK frame).

The PHY processor 215 (or the TX signal processing unit 280) of the AP generates a DL OFDMA PPDU 1200 and its components (e.g., 1231 and 1209 in FIG. 12A; 1101, 1202, 1203, 1204, 1205, 1206, 1207, 1208 in FIG. 12B; or 1301 and 1209 in FIG. 13A) based at least on the information received from the MAC processor 211 (e.g., SUBCARRIERS_LIST, a request for acknowledgment, etc.). A PSDU is generated based at least on a MAC frame.

In one aspect, the AP (e.g., 210 or 211 of the AP) determines sub-band allocation information, and provides this information to the STAs. In one example, the AP (e.g., 210 or 211 of the AP) provides to the PHY processor 215 (or the TX signal processing unit 280) the sub-band allocation information such as a TXVECTOR parameter (e.g., SUB-CARRIERS_LIST) so that the AP (e.g., 215 or 280 of the AP) can place the information within the DL OFDMA PPDU 1200 (e.g., a header such as HE SIG-A 1202 or HE SIG-B 1204) to be transmitted to the STAs. In another example, the AP (e.g., 210 or 211 of the AP) identifies the number and position of the sub-bands and provides them to the PHY processor 215 (or the TX signal processing unit 280), which places the information into the DL OFDMA PPDU 1200 (e.g., a header such as HE SIG-B 1204). In another example, the AP determines and provides to the STAs a predetermined size of the uplink bandwidth and a predetermined size of each sub-band. From such information, each of the STAs can determine the number of sub-bands and an implicit order of the sub-bands.

The AP (e.g., 215 or 280 of the AP) facilitates transmission of the DL OFDMA PPDU 1200 by providing the PPDU 1200 to the RF transmitter 221, which is coupled to the antenna unit 230. Each RX signal processing unit 290 of the plurality of STAs facilitates receipt of the DL OFDMA PPDU 1200 as an RX signal processing unit is coupled to an antenna unit 230 via its RF receiver 222.

In one aspect of preparing an uplink frame, an RX signal processing unit 290 of each of the plurality of STAs processes, demodulates and decodes the received DL OFDMA PPDU 1200 and provides the decoded information to its MAC processor 211. The MAC processor 211 of each of the plurality of STAs determines whether the STA is instructed to generate an uplink frame associated with firming a MU ACK frame (a UL OFDMA PPDU 1201). Each STA (e.g., 210 or 211 of the STA) checks for its ACK policy field in its PSDU of the received DL OFDMA PPDU 1200. For example, if a STA (e.g., 210 or 211) determines that its ACK policy field in the QoS control field 806 of its PSDU is 00 or "Normal Ack or implicit Block Ack Request" or if a BAR ACK policy field of a BAR frame is present in the corresponding payload of the DL OFDMA PPDU and requires acknowledgment, then the STA participates in forming the NIL ACK frame. Each STA (e.g., 210 or 211) can check whether the received DL OFDMA PPDU 1200 contains a data frame 800 or a BAR frame 700 or 780, and if the STA (e.g., 210 or 211) determines that a data frame is received, then the STA (e.g., 210 or 211) checks for an ACK policy field in the data frame. If the STA (e.g., 210 or 211) determines that a BAR frame is received, then the STA (e.g., 210 or 211) checks the content of the BAR frame to act accordingly.

If the AP sends a SUBCARRIERS_LIST in the DL OFDMA PPDU 1200, each of the plurality of STAs (e.g., 210 or 211 of each STA) may determine the sub-band information from the RXVECTOR parameter (containing SUBCARRIERS_LIST) of the DL OFDMA PPDU 1200. Depending on the method utilized, each STA discovers or determines the sub-band information.

Each STA (e.g., 210 or 211 of each STA), participating in forming a MU ACK frame, generates a reply to its respective acknowledgment request. This reply is in a form of an acknowledgment frame (e.g., an ACK frame 900 or a BA frame 1000 in a MAC format), which is provided to its processor (e.g., 210, 215 or 280).

Each such STA (e.g., 210, 215 or 280 of the STA) generates an uplink frame (in a PPDU format) associated with the STA based at least on the information (e.g., an acknowledgment frame and SUBCARRIERS_LIST, if any) from its processor (e.g., 210 or 211). Each such uplink frame includes a header (e.g., 1101) and an acknowledgment frame in a PSDU format (e.g., an ACK frame or a BA frame in a PSDU format, which may be, e.g., PSDU 1210). Each PSDU is associated with its sub-band. For example, a first STA generates, and transmits to the AP, a first uplink frame including a header 1101 and a first ACK or BA frame 1210. A second STA generates, and transmits to the AP, a second uplink frame including a header 1101 and a second ACK or BA frame 1211. The AP receives a UL OFDMA PPDU 1201 (a MU ACK frame) in which a plurality of uplink frames associated with STAs (e.g., the first uplink frame, the second uplink frame, etc.) are aggregated or combined into the MU ACK frame. A plurality of acknowledgment frames (e.g., the first ACK or BA frame and the second ACK or BA frame, etc.) are multiplexed or combined in frequency, as each ACK or BA frame occupies a different sub-band. It is noted that while FIGS. 12A-12B, 13A-13B and 14 show four, five or six STAs, the number of STAs are not limited to these numbers.

In other embodiments, an AP may use the QoS Control field in the MAC header of each MPDU and an extended HT control field (denoted as HE Control Extension (HECE) in the HT control field) in a DL payload to notify a STA (that has a payload in the DL MU frame) about the sub-band that the STA shall use to place its ACK or BA frame in the immediately multiplexed-ACK/BA frame. To do so, for each payload in a DL MU frame, an AP uses HECE in the MAC header and fills the designated "ACK/BA sub-band" field with the sub-band that the STA shall use to send its ACK or BA frame. The "ACK/BA sub-band" field in HECE is interpreted as follows: it is present in MAC headers of the MPDUs that are conveyed in a DL MU PPDU. If present, it indicates the sub-band or sub-bands that the AP assigns to the STA in order to place its ACK/BA frame in the multiplexed or MU ACK/BA frame in uplink direction.

Yet in other embodiments, the AP may instead add an action management frame, denoted as a trigger frame, to the DL data payload where the trigger frame identifies the sub-bands that the STA is going to use to place its ACK/BA frame in the UL multiplexed ACK/BA frame. There is a trigger frame aggregated with the data MPDUs for each STA, hence there is a trigger frame for each STA. The trigger frame has the following information for each STA: (a) the sub-band that the STA is going to use to send its ACK or BA frame in the UL OFDMA response, (b) the duration that the UL OFDMA frame is going to have, and (c) the MCS that the STA is going to use to modulate its ACK or BA frame.

In some embodiments, in the MU (or multiplexed) ACK/BA frame that immediately follows a DL MU PPDU, the AP that sends the DL MU PPDU may not assign all the sub-bands to the expecting ACK/BA frames. When AP leaves some such sub-bands unassigned, the AP indicates the unassigned sub-bands in the HE SIG-B of the DL MU PPDU, along with some other attributes of the MU ACK/BA frame such as its duration. Other STAs that have received the DL MU PPDU and decoded the HE SIG-B section of the frame successfully would realize which sub-bands are going to be available in the upcoming MU ACK/BA frame that immediately follows the DL MU PPDU. These STA would be allowed to send a control/management frame(s) (such as a uplink-request frame, a power save (PS)—poll frame, or even a delayed BA frame from an earlier exchange with the AP) or a data frame (which could be a QoS null frame that carries the queue size and may have a HECE field) in the unassigned sub-band only if the duration of the frame fits the specified duration of the MU ACK/BA frame.

In other embodiments, the AP that sends the DL MU PPDU may not assign all the sub-bands to the expecting ACK/BA frames and some sub-bands may be assigned to other STAs that the AP expects to receive some frame from (this could be based on prior exchanges that the AP has had with the STA, based on which the AP expects a short data frame or some control or management frames from the STA). The AP indicates the unassigned sub-bands in the HE SIG-B of the DL MU PPDU, along with some other attributes of the MU ACK/BA frame such as the AID/PAID of the STA that the AP assigns a sub-band to, the duration of the MU ACK/BA frame etc. The STA whose AID/PAID appears in an MU ACK/BA frame (but did not have a DL payload in the immediately preceding DL MU frame) would be allowed to send one or more control/management frames (such as a uplink-request frame, a PS-poll frame, or even a delayed BA frame from an earlier exchange with the AP) or a data frame (which could be a QoS null frame that carries the queue size and may have a HECE field) in the assigned sub-band only if the duration of the frame fits the specified duration of the MU ACK/BA frame. The term AM refers to an association identifier, and the term PAID refers to a partial AID.

In some embodiments, the following encoding per each sub-band in the UL MU ACK frame is used. Each STA that attempts to send an ACK or BA frame in response to the payload it has received in the preceding DL MU frame, would use all the sub-bands within the UL MU ACK frame; however, the encoding that is used for each sub-band is unique to each STA. The unique encoding used by each STA allows the AP to be able to use the payload of each STA despite that all or some of the STAs have used all or multiple sub-bands, or have used sub-bands that overlap with sub-bands used by another STA. The encoding used by each STA may be referred to as orthogonal coding. There may be multiple choices for orthogonal codes and the design of above-described PPDU is independent of the choice of the orthogonal codes.

In one embodiment, the orthogonal codes could be the set of Zadoff-Chu (ZC) codes. The orthogonal code that is used by each client/STA to code each sub-band could be the same across the same 20 MHz sub-band or could vary from one sub-band to another. However, in all the cases, it is assumed that the AP has a priori knowledge of which set of orthogonal codes is used by each STA. Given a DL MU frame, e.g., DL MU MIMO PPDU or DL OFDMA PPDU, has been sent to a set of STAs, the assignment of an orthogonal code (or the index to an orthogonal code) to a STA is done as discussed below.

In one aspect, there is an inherent order between the STAs that are addressed by a DL MU frame; hence, each client/STA knows what order or index it has within the DL MU frame (as it appears in a HE SIG-B symbol of a DL MU frame). Each STA processes the DL payload and the STA that has the ACK policy field in the QoS control field 806 (FIG. 8) set to 00 or "Normal Ack or implicit Block Ack Request" decides to send an ACK/BA frame, and chooses an orthogonal code from the set of orthogonal codes (that the AP has a priori assigned for the ACK/BA procedure) whose index is the same as the index that the STA has in the HE SIG-B symbol of the preceding DL MU PPM. This type of assignment means that a STA may choose a different orthogonal code in different DL MU frames depending on the index that it has. In another embodiment, the AP may assign a unique orthogonal code (by identifying an index) to each client/STA such that the STA uses the same orthogonal code throughout its association. Knowing the orthogonal code index, each STA constructs the PPDU for all or a set of sub-bands. In the PPDU that the client/STA constructs, the legacy portion is fixed across clients/STAs as well as the SIG-A portion. The AP would indicate in the preceding DL MU PPDU that the clients/STAs should indicate a fixed duration in L-LENGTH in the L-SIG symbol of the legacy portion of the frame.

In one aspect of processing an uplink frame, the AP (e.g., 215 or 290 of the AP) processes, demodulates and decodes the received UL OFDMA PPDU 1201 and provides the decoded information to its processor (e.g., 210 or 211). In one aspect, the AP (e.g., 215, 290 or 292 of the AP) demodulates a header (e.g., 1101) based at least on the uplink bandwidth and demodulates each acknowledgment frame (e.g., 1210, 1211, 1212, 1213) based on at least its respective sub-band. The AP (e.g., 210 or 211) determines whether an acknowledgment is received from each of the STAs that was instructed to participate in forming the MU ACK, frame. While examples of operations are described with respect to the wireless communication devices and their components shown or described with reference to FIG. 1, 2, 3A or 3B for ease of understanding, implementations of these operations are not limited to these examples, and the operations may be implemented using other devices and/or components or in a different manner.

Figure 15A:
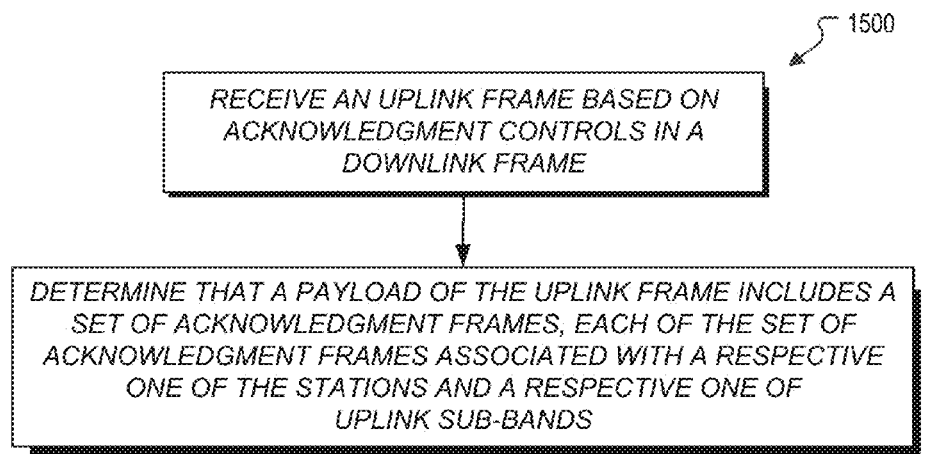
FIGS. 15A-15B illustrate flow charts of examples of an acknowledgment mechanism.
Figure 15B:
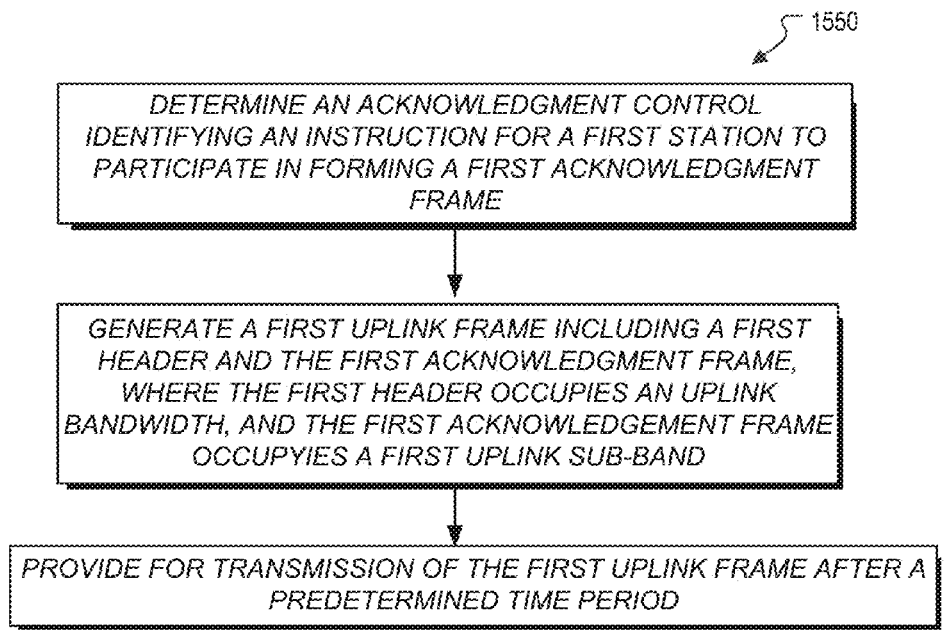

FIGS. 15A-15B illustrate flow charts of examples of an acknowledgment mechanism. For explanatory and illustration purposes, the example processes 1500 and 1550 may be performed by the wireless communication devices 111-115 of FIG. 1 and their components such as a baseband processor 210, a MAC processor 211, a MAC software processing unit 212, a MAC hardware processing unit 213, a PHY processor 215, a transmitting signal processing unit 280 and/or a receiving signal processing unit 290; however, the example processes 1500 and 1550 are not limited to the wireless communication devices 111-115 of FIG. 1 or their components, and the example processes 1500 and 1550 may be performed by some of the devices shown in FIG. 1, or other devices or components. Further for explanatory and illustration purposes, the blocks of the example processes 1500 and 1550 are described herein as occurring in serial or linearly. However, multiple blocks of the example processes 1500 and 1550 may occur in parallel. In addition, the blocks of the example processes 1500 and 1550 need not be performed in the order shown and/or one or more of the blocks of the example processes 1500 and 1550 need not be performed.

Various examples of aspects of the disclosure are described below as clauses for convenience. These are provided as examples, and do not limit the subject technology. Identifications of the figures and reference numbers are provided below merely as examples and for illustrative purposes, and the clauses are not limited by those identifications. As an example, some of the clauses described below are illustrated in FIGS. 15A-15B.

Clause A. A computer-implemented method of facilitating wireless communication based on orthogonal frequency-division multiple access (OFDMA), where the method includes: receiving an uplink frame that is based at least on a plurality of acknowledgment controls in a downlink frame, the uplink frame having a predetermined uplink bandwidth, the uplink frame comprising a payload; and determining that the payload comprises a plurality of acknowledgment frames, each of the plurality of acknowledgment frames associated with a respective one of a plurality of stations, each of the plurality of acknowledgment frames associated with a respective one of a plurality of uplink sub-bands, each of the plurality of uplink sub-bands being a portion of the predetermined uplink bandwidth.

Clause B. An apparatus for facilitating wireless communication, where the apparatus includes one or more memories, and one or more processors coupled to the one or more memories, where the one or more processors are configured to cause: receiving an uplink frame that is based at least on a plurality of acknowledgment controls in a downlink frame, the uplink frame having a predetermined uplink bandwidth, the uplink frame comprising a payload; and determining that the payload comprises a plurality of acknowledgment frames, each of the plurality of acknowledgment frames associated with a respective one of a plurality of stations, each of the plurality of acknowledgment frames associated with a respective one of a plurality of uplink sub-bands, each of the plurality of uplink sub-bands being a portion of the predetermined uplink bandwidth.

Clause C. A computer-readable storage medium storing computer-executable instructions that, when executed by one or more processors, cause one or more processors to perform operations including: receiving an uplink frame that is based at least on a plurality of acknowledgment controls in a downlink frame, the uplink frame having a predetermined uplink bandwidth, the uplink frame comprising a payload; and determining that the payload comprises a plurality of acknowledgment frames, each of the plurality of acknowledgment frames associated with a respective one of a plurality of stations, each of the plurality of acknowledgment frames associated with a respective one of a plurality of uplink sub-bands, each of the plurality of uplink sub-bands being a portion of the predetermined uplink bandwidth.

Clause D. A computer-implemented method of facilitating wireless communication based on orthogonal frequency-division multiple access (OFDMA), where the method includes: determining an acknowledgment control in a portion of a downlink frame, the acknowledgment control identifying an instruction for a first station to participate in forming a first acknowledgment frame; generating a first uplink frame, the first uplink frame comprising a first header and the first acknowledgment frame, the first header occupying an uplink bandwidth, the first acknowledgment frame occupying a first uplink sub-band, the first uplink sub-band being a portion of the uplink bandwidth, the generating comprising generating the first acknowledgment frame based on at least the acknowledgment control and the first uplink sub-band; and transmitting the first uplink frame after a predetermined time period.

Clause E. An apparatus for facilitating wireless communication, where the apparatus includes one or more memories, and one or more processors coupled to the one or more memories, where the one or more processors are configured to cause: determining an acknowledgment control in a portion of a downlink frame, the acknowledgment control identifying an instruction for a first station to participate in forming a first acknowledgment frame; generating a first uplink frame, the first uplink frame comprising a first header and the first acknowledgment frame, the first header occupying an uplink bandwidth, the first acknowledgment frame occupying a first uplink sub-band, the first uplink sub-band being a portion of the uplink bandwidth, the generating comprising generating the first acknowledgment frame based on at least the acknowledgment control and the first uplink sub-band; and transmitting the first uplink frame after a predetermined time period.

Clause F. A computer-readable storage medium storing computer-executable instructions that, when executed by one or more processors, cause one or more processors to perform operations including: determining an acknowledgment control in a portion of a downlink frame, the acknowledgment control identifying an instruction for a first station to participate in forming a first acknowledgment frame; generating a first uplink frame, the first uplink frame comprising a first header and the first acknowledgment frame, the first header occupying an uplink bandwidth, the first acknowledgment frame occupying a first uplink sub-band, the first uplink sub-band being a portion of the uplink bandwidth, the generating comprising generating the first acknowledgment frame based on at least the acknowledgment control and the first uplink sub-band; and transmitting the first uplink frame after a predetermined time period.

Each of implementations of Clauses A, B, C, D, E and F may include one or more of the following additional clauses in any combination, may include some portions of one or more of the following additional clauses in any combination, and/or may include some combination of any of the foregoing.

Clause 1: wherein the downlink frame is a physical layer convergence procedure (PLCP) protocol data unit (PPM).

Clause 2: wherein the uplink frame is a physical layer convergence procedure (PLCP) protocol data unit (PPDU).

Clause 3: wherein the predetermined time period is a short interframe space (SIFS).

Clause 4: wherein the plurality of acknowledgment frames include one or more of acknowledgment frames or block acknowledgment frames from the plurality of stations.

Clause 5: the method or operations further comprising determining that an associated payload in the downlink frame includes an acknowledgment control field containing a predetermined value identifying a request for the first station to participate in forming the acknowledgment frame.

Clause 6: wherein the associated payload is a physical layer convergence procedure (PLCP) service data unit (PSDU).

Clause 7: wherein the acknowledgment control field is included in a quality-of-service control field of the associated payload.

Clause 8: wherein the downlink frame is a high efficiency (HE) physical layer convergence procedure (PLCP) protocol data unit (PPDU) format.

Clause 9: wherein the downlink frame includes a legacy section, high efficiency (HE) SIG-A signaling, HE short training field (STF) signaling, HE long training field (LTF) signaling, HE SIG-B signaling, and a payload section, wherein the legacy section relates to non-high-throughput (HT) signaling.

Clause 10: wherein the generating the downlink frame comprises modulating symbols included in the legacy section with a fast fourier transform size of 64.

Clause 11: wherein when a downlink bandwidth of the downlink frame is greater than 20 MHz and comprises sub-channels, the generating the downlink frame comprises modulating symbols of the legacy section on one of the sub-channels and duplicating the modulated symbols on each of the remaining one or more of the sub-channels to allow the legacy section to utilize all of the downlink bandwidth, wherein each of the sub-channels is equal in size.

Clause 12: wherein when a downlink bandwidth of the downlink frame is greater than 20 MHz and comprises sub-channels, the generating the downlink frame comprises modulating the HE SIG-A signaling with a fast fourier transform size of 64 on one of the sub-channels and duplicating the modulated HE SIG-A signaling on each of the remaining one or more of the sub-channels to allow the HE SIG-A signaling, wherein each of the sub-channels is 20 MHz.

Clause 13: wherein the generating the downlink frame comprises modulating the HE STF signaling, the HE LTF signaling and the HE SIG-B signaling with a fast fourier transform size of 256 over an entire downlink bandwidth of the downlink frame.

Clause 14: wherein the downlink frame comprises a plurality of payloads directed the plurality of stations.

Clause 15: wherein the generating the downlink frame comprises modulating each of the plurality of payloads with a fast fourier transform size of 256.

Clause 16: wherein the generating the downlink frame comprises modulating each of the plurality of payloads over a respective one of a plurality of downlink sub-bands.

Clause 17: wherein the plurality of uplink sub-bands are of varying bandwidth.

Clause 18: wherein the plurality of uplink sub-bands are non-contiguous.

Clause 19: wherein a medium access control (MAC) component of the first station is configured to generate a payload and configured to provide the payload to a physical layer (PHY) component of the first station, wherein the payload comprises the first acknowledgment frame in a MAC format.

Clause 20: wherein a physical layer (PHY) component of an access point station is configured to facilitate transmission of the downlink frame.

Clause 21: wherein the predetermined uplink bandwidth is selected from the group consisting of 20 MHz, 40 MHz, 80 MHz, 160 MHz and 80+80 MHz, and wherein a downlink bandwidth of the downlink frame is selected from the group consisting of 20 MHz, 40 MHz, 80 MHz, 160 MHz and 80+80 MHz.

Clause 22: wherein the first header comprises a legacy section.

Clause 23: wherein the generating the first uplink frame comprises modulating symbols included in the legacy section with a fast fourier transform size of 64.

Clause 24: when the uplink bandwidth is greater than 20 MHz and comprises sub-channels, the generating the first uplink frame comprises modulating symbols of the legacy section on one of the sub-channels and duplicating the modulated symbols on each of the remaining one or more of the sub-channels to allow the legacy section to utilize all of the uplink bandwidth, wherein each of the sub-channels is equal in size.

Clause 25: wherein the uplink frame is aggregation of a plurality of uplink frames from the plurality of stations, wherein each of the plurality of uplink frames comprises a legacy section and a respective one of the plurality of acknowledgment frames.

Clause 26: wherein a medium access control (MAC) component of a station is configured to generate a frame including an acknowledgment policy and provide the generated acknowledgment frame to a physical layer (PHY) component of the station.

Clause 27: wherein a physical layer (PHY) component of the first station is configured to facilitate transmission of the first uplink frame directed to an access point.

Clause 28: wherein the first header comprises a legacy section and a high efficiency (HE) SIG-A signaling.

Clause 29: the method or operations comprising: modulating the SIG-A signaling with a fast fourier transform size of 64 on one of sub-channels; and duplicating the modulated HE SIG-A signaling on the remaining one or more of the sub-channels, wherein the uplink bandwidth consists of the sub-channels.

Clause 30: wherein the HE SKI-A signaling comprises at least one symbol.

Clause 31: the method or operations comprising: generating and providing, by a medium access control (MAC) component of a station to a physical layer (PHY) of the station, a transmit vector parameter with a subcarriers list; and determining, by the PHY component, based at least on the subcarriers list, a set of sub-bands to be used to place payloads into the downlink frame.

Clause 32: the method or operations comprising: sending, by the PHY component to the MAC component, a receive vector parameter with a second subcarriers list associated with the uplink frame; and determining, by the MAC component, based at least on the second subcarriers list, which sub-bands are used for the payload of the uplink frame.

Clause 33: the method or operations comprising: modulating the legacy section of the first uplink frame with a fast fourier transform size of 64 on one of sub-channels; and duplicating the modulated legacy section on the remaining one or more of the sub-channels, wherein the uplink bandwidth consists of the sub-channels.

Clause 34: wherein the first header comprises a legacy section and a partial high efficiency (HE) physical layer convergence procedure (PLCP).

Clause 35: wherein the payload section of the uplink frame is modulated with a fast fourier transform size of 256.

Clause 36: the method or operations comprising: sending, by a medium access control (MAC) component of the first station to a physical layer (PHY) component of the first station, a transmit vector parameter with a length parameter; and padding the first acknowledgment frame based on the length parameter to allow the first acknowledgment frame to fit within a predetermined time duration.

Clause 37: wherein the length parameter is set to a corresponding value indicated in a second length parameter of a high efficiency (HE) control field in the downlink frame.

Clause 38: wherein the length parameter is set to a corresponding value indicated in a high efficiency (HE) SIG-A signaling or HE SIG-B signaling of the downlink frame.

Clause 39: wherein the length parameter is set to a fixed value corresponding to a maximum length of a block acknowledgment frame when the block acknowledgment frame is modulated with a predetermined modulation and coding scheme.

Clause 40: wherein a maximum value of the length parameter is identified during association between an access point and the first station or is identified in one or more beacon frames.

Clause 41: wherein the length parameter is set to a predetermined value known by the plurality of stations and an access point.

Clause 42: wherein the HE SIG-A signaling of the first uplink frame is encoded at least with a value indicated by a channel bandwidth parameter associated with the downlink frame.

Clause 43: the method or operations comprising setting a subcarriers list parameter of a transmit vector associated with the first uplink frame to a same value as a subcarriers list parameter of a receive vector associated with the downlink frame, wherein the first sub-band is associated with the subcarriers list parameter of the transmit vector.

Clause 44: the method or operations comprising generating, by a medium access control (MAC) component of the first station, a subcarriers list of a transmit vector based on a subcarriers list associated with the downlink frame, the subcarriers list of the transmit vector identifying a plurality of uplink sub-bands, the plurality of uplink sub-bands comprising the first uplink sub-band.

Clause 45: wherein the subcarriers list associated with the downlink frame comprises an index, the index included in a HE SIG-A signaling or a HE SIG-B signaling of the downlink frame.

Clause 46: wherein a subcarriers list parameter of a transmit vector associated with an uplink frame is set to a corresponding value of a multi-user acknowledgment (MUACK)-sub-band parameter included in a HE SIG-A signaling or a HI SIG-B signaling of the downlink frame, wherein the MUACK-sub-band parameter represents sub-band allocation for an uplink frame, wherein the first uplink frame is associated with the uplink frame.

Clause 47: wherein the MUACK-sub-band of the downlink frame is set to a value indicating that a corresponding one of a plurality of stations does not have a sub-band allocated for sending an acknowledgment frame when a corresponding acknowledgment policy field of the downlink frame is set with a value corresponding to an instruction for the corresponding one of the plurality of stations to not send an acknowledgment frame.

Clause 48: wherein the MUACK-sub-band of the downlink frame is set to a value indicating that a corresponding one of a plurality of stations has a sub-band allocated for sending an acknowledgment frame when a corresponding acknowledgment policy field of the downlink frame is set with a value corresponding to an instruction for the corresponding one of the plurality of stations to send an acknowledgment frame.

Clause 49: wherein the downlink frame includes an indication of a number and position of the plurality of uplink sub-bands allocated for the uplink frame.

Clause 50: wherein the indication is included within a HE SIG-B signaling of the downlink frame.

Clause 51: wherein each of the plurality of stations is allocated to a respective one of the plurality of uplink sub-bands in a predetermined order.

Clause 52: wherein a sub-band of the plurality of uplink sub-bands with a lowest frequency is assigned to a first index, and other sub-bands of the plurality of uplink sub-bands are assigned to indices incremented from the first index.

Clause 53: wherein the plurality of uplink sub-bands are predetermined by an access point, and the access point facilitates providing information about the predetermined plurality of uplink sub-bands to the plurality of stations.

Clause 54: wherein the uplink bandwidth of the uplink frame is same as a downlink bandwidth of the downlink frame.

Clause 55: wherein the uplink bandwidth of the uplink frame is narrower than a downlink bandwidth of the downlink frame.

Clause 56: wherein the uplink bandwidth of the uplink frame is set to a fixed value irrespective of a downlink bandwidth of the downlink frame, but narrower than the downlink bandwidth of the downlink frame.

Clause 57: wherein an indication of the predetermined uplink bandwidth is included in a HE SIG-A signaling or a HE SIG-B signaling of the downlink frame.

Clause 58: wherein an indication of a total number of the plurality of uplink sub-bands is a part of the indication of the predetermined uplink bandwidth, wherein a bandwidth of each of the plurality of uplink sub-bands assigned to a respective one of the plurality of stations is same.

Clause 59: wherein when the uplink frame is received based on an implicit acknowledgment request, the uplink frame comprises a guard interval value set to a counterpart value of a guard interval value of a receive vector parameter in the downlink frame.

Clause 60: wherein when a block acknowledgment frame is received based on an implicit block acknowledgment request, the uplink frame comprises a guard interval value set to a counterpart value of a guard interval value of a receive vector parameter in the downlink frame or set to a pre-determined guard interval value, or set to a pre-determined longer guard interval value.

Clause 61: the method or operations comprising: comparing, by a medium access control (MAC) component of a station, a subcarriers list associated with the downlink frame with a subcarriers list associated with the uplink frame to identify whether an acknowledgment frame is received from a respective one of the plurality of stations instructed to provide acknowledgment.

Clause 62: wherein the downlink frame has a predetermined downlink bandwidth; the downlink (DL) frame is a DL OFDMA physical layer convergence procedure protocol data unit (PPDU); the DL OFDMA PPDU comprises a legacy header, a high efficiency (HE) header and a downlink payload; the downlink payload comprises downlink physical layer convergence procedure service data units (PSDUs); the downlink PSDUs comprise the plurality of acknowledgment controls; each of the downlink PSDUs is associated with a respective one of the plurality of stations; each of the downlink PSDUs is associated with a respective one of a plurality of downlink sub-bands; each of the plurality of downlink sub-bands is a portion of the predetermined downlink bandwidth; the uplink (UL) frame is a UL OFDMA PPDU, which is a multi-user acknowledgment (MU ACK) frame; the UL OFDMA PPDU comprises a legacy header and the payload; the payload comprises uplink PSDUs; the uplink PSDUs represent the plurality of acknowledgment frames; each of the uplink PSDUs is associated with a respective one of the plurality of stations; and each of the uplink PSDUs is associated with a respective one of the plurality of uplink sub-bands.

Clause 63: wherein the legacy header of the DL OFDMA PPDU is associated with the predetermined downlink bandwidth; the HE header of the DL OFDMA PPDU is associated with the predetermined downlink bandwidth; the legacy header of the UL OFDMA PPDU is associated with the predetermined uplink bandwidth; the predetermined downlink bandwidth and the predetermined uplink bandwidth are same; a size of each of the plurality of downlink sub-bands and a size of each of the plurality of uplink sub-bands are same; and an order of the plurality of downlink sub-bands and an order of the plurality of uplink sub-bands are same.

Clause 64: the method or operations comprising determining that the uplink frame further comprises a legacy header and a HE header, wherein the legacy header is associated with the predetermined uplink bandwidth; and wherein the RF header is associated with the predetermined uplink bandwidth.

Clause 65: wherein the downlink frame has a predetermined downlink bandwidth; the downlink frame comprises physical layer convergence procedure service data units (PSDUs); the PSDUs comprise the plurality of acknowledgment controls; each of the PSDUs is associated with a respective one of a plurality of downlink sub-bands; each of the plurality of downlink sub-bands is a portion of the predetermined downlink bandwidth; a size of one of the plurality of downlink sub-bands is different from a size of another one of the plurality of downlink sub-bands; a size of one of the plurality of uplink sub-bands is different from a size of another one of the plurality of uplink sub-bands; the size of the one of the plurality of downlink sub-bands is equal to the size of the one of the plurality of uplink sub-bands; and the size of the another one of the plurality of downlink sub-bands is equal to the size of the another one of the plurality of uplink sub-bands.

Clause 66: the method or operations comprising: processing the uplink frame in a sub-band of the plurality of uplink sub-bands; determining that the uplink frame does not contain an acknowledgment frame from one of the plurality of stations assigned to the sub-band; and facilitating retransmission of the downlink frame, the downlink frame comprising a payload, wherein the payload comprises an acknowledgment control associated with the one of the plurality of stations.

Clause 67: wherein the downlink frame has a predetermined downlink bandwidth; the downlink frame comprises physical layer convergence procedure service data units (PSDUs); the PSDUs comprise the plurality of acknowledgment controls and one or more acknowledgment controls; each of the one or more acknowledgment controls is associated with a respective one of one or more stations; each of the PSDUs is associated with a respective one of a plurality of downlink sub-bands; each of the plurality of downlink sub-bands is a portion of the predetermined downlink bandwidth; and a total number of the plurality of downlink sub-bands is different from a total number of the plurality of uplink sub-bands.

Clause 68: wherein the downlink frame has a predetermined downlink bandwidth; wherein the predetermined uplink bandwidth is narrower than the predetermined downlink bandwidth.

Clause 69: the method or operations comprising: generating a first subcarriers list; providing the first subcarriers list into the downlink frame; comparing the first subcarriers list with a second subcarriers list obtained from the uplink frame; identifying stations that are contributors of forming the uplink frame, wherein the first subcarriers list represents a listing of index values, wherein the index values represent sub-band allocations for the plurality of acknowledgment frames.

Clause 70: wherein the plurality of acknowledgment frames comprise an acknowledgment (ACK) frame and a block acknowledgment (BA) frame, wherein the acknowledgment frame is not a block acknowledgment frame; wherein the method or operations comprise assigning a first sub-band for the ACK frame; assigning a second sub-band for the BA frame, wherein the first sub-band is narrower than the second sub-band.

Clause 71: wherein the facilitating transmission of the first uplink frame comprises facilitating transmission of the first uplink frame upon completion of the predetermined time period, to allow aggregation of the first acknowledgment frame and one or more other acknowledgment frames into a payload of an uplink frame, the uplink frame having the uplink bandwidth, the first acknowledgment frame associated with the first station of a plurality of stations, each of the one or more other acknowledgment frames associated with a respective one of the plurality of stations, each of the one or more other acknowledgment frames associated with a respective one of a plurality of uplink sub-bands, the first uplink sub-band being one of the plurality of uplink sub-bands, each of the plurality of uplink sub-bands being a portion of the uplink bandwidth.

Clause 72: wherein the downlink frame has a downlink bandwidth; the downlink frame comprises physical layer convergence procedure service data units (PSDUs); each of the PSDUs is associated with a respective one of a plurality of downlink sub-hands; each of the plurality of downlink sub-bands is a portion of the downlink bandwidth; a first one of the PSDUs comprises the acknowledgment control; the first one of the PSDUs is associated with a first one of the plurality of downlink sub-bands; the first one of the PSDUs is associated with the first station; the downlink bandwidth is equal to the uplink bandwidth; and a size of the first one of the plurality of downlink sub-bands is equal to a size of the first uplink sub-band.

Clause 73: wherein the downlink frame has a downlink bandwidth; the downlink frame comprises physical layer convergence procedure service data units (PSDUs); each of the PSDUs is associated with a respective one of a plurality of downlink sub-bands; each of the plurality of downlink sub-bands is a portion of the downlink bandwidth; a first one of the PSDUs comprises the acknowledgment control; the first one of the PSDUs is associated with a first one of the plurality of downlink sub-bands; the first one of the PSDUs is associated with the first station; and a size of the first one of the plurality of downlink sub-bands is different from a size of the first uplink sub-band.

Clause 74: wherein the downlink frame has a downlink bandwidth; the downlink frame comprises physical layer convergence procedure service data units (PSDUs); each of the PSDUs is associated with a respective one of a plurality of downlink sub-bands; each of the plurality of downlink sub-bands is a portion of the downlink bandwidth; a first one of the PSDUs comprises the acknowledgment control; the first uplink sub-band is one of a plurality of uplink sub-bands; each of the plurality of uplink sub-bands is a portion of the uplink bandwidth; and a total number of the plurality of downlink sub-bands is different from a total number of the plurality of uplink sub-bands.

Clause 75: wherein the downlink frame has a downlink bandwidth; and the uplink bandwidth is narrower than the downlink bandwidth.

Clause 76: the method or operations comprising determining the first uplink sub-band based at least on a subcarriers list in a portion of the downlink frame.

Clause 77: the method or operations comprising padding the first acknowledgment frame to lengthen the first acknowledgment frame and to allow the first acknowledgment frame to have a predetermined time duration, wherein: the facilitating transmission of the first uplink frame allows the first acknowledgment frame to be aggregated with one or more acknowledgment frames having the same predetermined time duration, each of the one or more acknowledgment frames is associated with a respective one of a plurality of uplink sub-bands; the first uplink sub-band is one of the plurality of uplink sub-bands; and each of the plurality of uplink sub-bands is a portion of the uplink bandwidth.

Clause 78: wherein the one or more processors are configured to cause: determining a size of the uplink bandwidth from the downlink frame, from one or more beacon frames, or during an association time between the first station and a second station, wherein the second station is configured to provide the downlink frame.

Clause 79: wherein an apparatus comprises: a radio frequency transmitter coupled to a baseband processor, the radio frequency transmitter configured to transform the downlink frame from a digital form to an analog form and configured to modulate and provide the downlink frame in the analog form; an antenna unit coupled to the radio frequency transmitter, the antenna unit configured to receive and transmit the downlink frame, the antenna unit configured to receive the uplink frame; a radio frequency receiver coupled to the baseband processor, the radio frequency receiver configured to transform the uplink frame from an analog form to a digital form and provide the uplink frame, where the apparatus further comprises an input interface unit, an output interface unit, a bus, an input device, and an output device.

By way of non-limiting example, each of Clauses A, B, and C may include one or more of the following combinations: Clause 9 with Clause 10; Clause 9 with Clause 11; Clause 9 with Clause 12; Clause 9 with Clause 113; Clause 9 with Clause 31; Clause 9 with Clause 31 and Clause 32; Clause 14 with Clause 15; Clause 14 with Clause 16; Clause 31 with Clause 32; Clause 32 with Clause 33; Clause 46 with Clause 47; Clause 46 with Clause 48; Clause 49 with Clause 50; Clause 57 with Clause 58; Clause 62 with Clause 63.

By way of non-limiting example, each of Clauses D, E and F may include one or more of the following combinations: Clause 5 with Clause 6; Clause 5 with Clause 7; Clause 22 with Clause 23; Clause 22 with Clause 24; Clause 22 with Clause 33; Clause 28 with Clause 29; Clause 28 with Clause 30; Clause 28 with Clause 42; Clause 36 with Clause 37; Clause 36 with Clause 38; Clause 36 with Clause 39; Clause 36 with Clause 40; Clause 36 with Clause 41; Clause 44 with Clause 45; Clause 46 with Clause 47; Clause 46 with Clause 48.

In one or more aspects, additional clauses are described below.

A method comprising one or more methods or operations of any one or more of the foregoing Clauses.

An apparatus comprising one or more memories and one or more processors (e.g., 210), the one or more processors configured to cause performing one or more methods or operations of any one or more of the foregoing Clauses.

An apparatus comprising one or more memories (e.g., 240, one or more internal, external or remote memories, or one or more registers) and one or more processors (e.g., 210) coupled to the one or more memories, the one or more processors configured to cause the apparatus to perform one or more methods or operations of any one or more of the foregoing Clauses.

A processor (e.g., 210) comprising modules for carrying out one or more methods or operations of any one or more of the foregoing Clauses.

A hardware apparatus comprising circuits (e.g., 210) configured to perform one or more methods or operations of any one or more of the foregoing Clauses.

An apparatus comprising means (e.g., 210) adapted for performing one or more methods or operations of any one or more of the foregoing Clauses.

An apparatus comprising components (e.g., 210) operable to carry out one or more methods or operations of any one or more of the foregoing Clauses.

A computer-readable storage medium (e.g., 240, one or more internal, external or remote memories, or one or more registers) comprising instructions stored therein, the instructions comprising code for performing one or more methods or operations of any one or more of the foregoing Clauses.

A computer-readable storage medium (e.g., 240, one or more internal, external or remote memories, or one or more registers) storing instructions that, when executed by one or more processors, cause one or more processors to perform one or more methods or operations of any one or more of the foregoing Clauses.

In one aspect, a method may be an operation, an instruction, or a function and vice versa. In one aspect, a clause may depend from any other one or more of the other clauses. In one aspect, a clause may be amended to include some or all of the words (e.g., instructions, operations, functions, or components) recited in other one or more clauses, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus for facilitating wireless communication based on orthogonal frequency-division multiple access (OFDMA), the apparatus comprising:
one or more memories; and
one or more processors coupled to the one or more memories, the one or more processors configured to cause:
receiving an uplink frame that is based at least on a plurality of acknowledgment controls in a downlink frame, the uplink frame having a predetermined uplink bandwidth, the uplink frame comprising a payload, wherein the uplink frame comprises a legacy header and a high efficiency (HE) header, wherein the legacy header is associated with the predetermined uplink bandwidth, wherein the HE header is associated with the predetermined uplink bandwidth, wherein the HE header comprises signaling for one or more stations not intended to participate in forming the uplink frame, and wherein the signaling comprises at least one of a duration of the uplink frame or an indication whether there would be a downlink response frame to the uplink frame; and
determining that the payload comprises a plurality of acknowledgment frames, each of the plurality of acknowledgment frames associated with a respective one of a plurality of stations, each of the plurality of acknowledgment frames associated with a respective one of a plurality of uplink sub-bands, each of the plurality of uplink sub-bands being a portion of the predetermined uplink bandwidth.

2. The apparatus of claim 1, wherein:
each of the plurality of uplink sub-bands is assigned to a respective one of the plurality of stations; and
each of the plurality of acknowledgment controls indicates acknowledgment participation by a respective one of the plurality of stations.

3. The apparatus of claim 1, wherein a size of one of the plurality of uplink sub-bands is different from a size of another one of the plurality of uplink sub-bands.

4. The apparatus of claim 1, wherein the one or more processors are configured to cause:
determining that the uplink frame does not contain an acknowledgment frame from one of the plurality of stations assigned to an uplink sub-band; and
retransmitting the downlink frame, the downlink frame comprising a payload, wherein the payload comprises an acknowledgment control associated with the one of the plurality of stations.

5. The apparatus of claim 1, wherein:
the plurality of acknowledgment controls are associated with a plurality of downlink sub-bands; and
a total number of the plurality of downlink sub-bands is different from a total number of the plurality of uplink sub-bands.

6. The apparatus of claim 1, wherein:
the downlink frame has a predetermined downlink bandwidth; and
the predetermined uplink bandwidth is narrower than the predetermined downlink bandwidth.

7. The apparatus of claim 1, wherein the one or more processors are configured to cause:
generating a first subcarriers list;
providing the first subcarriers list in the downlink frame; and
identifying stations that are contributors for forming the uplink frame based on the first subcarriers list and a second subcarriers list obtained from the uplink frame.

8. The apparatus of claim 1, wherein the plurality of acknowledgment frames comprise an acknowledgment (ACK) frame and a block acknowledgment (BA) frame, wherein the ACK frame is not a BA frame,
wherein the one or more processors are configured to cause:
assigning a first sub-band for the ACK frame; and
assigning a second sub-band for the BA frame, and
wherein the first sub-band is narrower than the second sub-band.

9. A tangible computer-readable storage medium storing computer-executable instructions that, when executed by one or more processors, cause one or more processors to perform operations, the operations comprising:
determining an acknowledgment control in a portion of a downlink frame, the acknowledgment control identifying an instruction for a first station to participate in forming a first acknowledgment frame;
determining a first uplink sub-band based at least on a subcarriers list from the downlink frame;
generating a first uplink frame, the first uplink frame comprising a first header and the first acknowledgment frame, the first header occupying an uplink bandwidth, the first acknowledgment frame occupying the first uplink sub-band, the first uplink sub-band being a portion of the uplink bandwidth, the generating comprising generating the first acknowledgment frame based on at least the acknowledgment control and the first uplink sub-band; and
providing for transmission of the first uplink frame after a predetermined time period.

10. The tangible computer-readable storage medium of claim 9, wherein the transmission of the first uplink frame comprises:
transmission of the first uplink frame upon completion of the predetermined time period, to allow aggregation of the first acknowledgment frame and one or more other acknowledgment frames into a payload of an uplink frame, the uplink frame having the uplink bandwidth, the first acknowledgment frame associated with the first station of a plurality of stations, each of the one or more other acknowledgment frames associated with a respective one of the plurality of stations, each of the one or more other acknowledgment frames associated with a respective one of a plurality of uplink sub-bands, the first uplink sub-band being one of the plurality of uplink sub-bands, each of the plurality of uplink sub-bands being a portion of the uplink bandwidth, wherein the first station is different from the respective one of the plurality of stations.

11. The tangible computer-readable storage medium of claim 9, wherein:
the acknowledgment control of the downlink frame is associated with a downlink sub-band;
the downlink sub-band is a portion of a downlink bandwidth of the downlink frame; and
a size of the downlink sub-band is different from a size of the first uplink sub-band.

12. The tangible computer-readable storage medium of claim 9, wherein:
the downlink frame comprises payload portions associated with a plurality of downlink sub-bands;
the first uplink sub-band is one of a plurality of uplink sub-bands; and
a total number of the plurality of downlink sub-bands is different from a total number of the plurality of uplink sub-bands.

13. The tangible computer-readable storage medium of claim 9, wherein:
the downlink frame has a downlink bandwidth; and
the uplink bandwidth is narrower than the downlink bandwidth.

14. The tangible computer-readable storage medium of claim 9, wherein the operations comprise padding the first acknowledgment frame to lengthen the first acknowledgment frame to cause the first acknowledgment frame to have a predetermined time duration, wherein:
the transmission of the first uplink frame allows the first acknowledgment frame to be aggregated with one or more acknowledgment frames having the same predetermined time duration; and
each of the one or more acknowledgment frames is associated with a respective one of a plurality of stations.

15. A computer-implemented method of facilitating wireless communication, the method comprising:
determining an acknowledgment control in a portion of a downlink frame, the acknowledgment control identifying an instruction for a first station to participate in forming a first acknowledgment frame;
determining a size of an uplink bandwidth from the downlink frame, from one or more beacon frames, or during an association time between the first station and a second station, wherein the second station is configured to provide the downlink frame;
generating a first uplink frame, the first uplink frame comprising a first header and the first acknowledgment frame, the first header occupying the uplink bandwidth, the first acknowledgment frame occupying a first uplink sub-band, the first uplink sub-band being a portion of the uplink bandwidth, the generating comprising generating the first acknowledgment frame based on at least the acknowledgment control and the first uplink sub-band; and
transmitting the first uplink frame after a predetermined time period.

16. The computer-implemented method of claim 15, wherein:
a first payload portion of the downlink frame is destined for the first station;
the first payload portion occupies a first downlink sub-band; and
a size of the first uplink sub-band is different from a size of the first downlink sub-band.

* * * * *